(12) United States Patent
Sie et al.

(10) Patent No.: US 7,809,849 B2
(45) Date of Patent: Oct. 5, 2010

(54) PRE-STORING MULTIPLE PROGRAMS WITH USER CONTROL OF PLAYBACK

(75) Inventors: John J. Sie, Englewood, CO (US); John C. Beyler, Chappaque, NY (US); Martin F. Sabraw, Centennial, CO (US)

(73) Assignee: Starz Entertainment, LLC, Englewood, CO (US)

( * ) Notice: Subject to any disclaimer, the term of this patent is extended or adjusted under 35 U.S.C. 154(b) by 1664 days.

(21) Appl. No.: 09/877,317

(22) Filed: Jun. 8, 2001

(65) Prior Publication Data

US 2002/0095510 A1    Jul. 18, 2002

Related U.S. Application Data

(63) Continuation-in-part of application No. 09/687,151, filed on Oct. 12, 2000.

(60) Provisional application No. 60/159,202, filed on Oct. 13, 1999, provisional application No. 60/159,469, filed on Oct. 13, 1999, provisional application No. 60/163,324, filed on Nov. 3, 1999, provisional application No. 06/275,496, filed on Mar. 13, 2001.

(51) Int. Cl.
*G06F 15/16* (2006.01)

(52) U.S. Cl. ............ 709/231; 709/232; 725/61; 725/86; 725/87; 725/88; 725/101; 725/102

(58) Field of Classification Search ............... 709/231; 725/8, 86–102, 131–153, 61
See application file for complete search history.

(56) References Cited

U.S. PATENT DOCUMENTS

| | | | |
|---|---|---|---|
| 4,949,187 A | | 8/1990 | Cohen |
| 5,130,792 A | | 7/1992 | Tindell et al. |
| 5,191,573 A | | 3/1993 | Hair |
| 5,530,754 A | | 6/1996 | Garfinkle |
| 5,532,735 A | * | 7/1996 | Blahut et al. ............ 725/8 |
| 5,583,937 A | * | 12/1996 | Ullrich et al. ........... 380/211 |

(Continued)

OTHER PUBLICATIONS

Ciciora, Walter; James Farmer, David Large; *Modern Cable Television Technology: Video, Voice, and Data Communications*; Morgan Kaufmann Publishers. Inc.; 1999; Chapter 16; pp. 659-688.

(Continued)

*Primary Examiner*—Alina N. Boutah
(74) *Attorney, Agent, or Firm*—Townsend and Townsend and Crew LLP

(57) ABSTRACT

According to the invention, a method for receiving a program by a user location is disclosed. The program is sent from a content provider. In one step, at least a first segment of each of a first number of programs sent from the content provider before any user request for any of the first number of programs is recorded. The user request for one of the first number of programs is detected. At least a second segment of each of a second number of programs sent from the content provider is also recorded if the user request is not detected before a stagger period expires. The one of the first number of programs is recorded if the user request is detected before the stagger period expires.

23 Claims, 36 Drawing Sheets

U.S. PATENT DOCUMENTS

| | | | |
|---|---|---|---|
| 5,592,551 A * | 1/1997 | Lett et al. | 380/211 |
| 5,594,491 A * | 1/1997 | Hodge et al. | 723/103 |
| 5,606,359 A * | 2/1997 | Youden et al. | 725/88 |
| 5,619,249 A | 4/1997 | Billock et al. | |
| 5,675,734 A | 10/1997 | Hair | |
| 5,682,597 A * | 10/1997 | Ganek et al. | 455/3.04 |
| 5,701,383 A | 12/1997 | Russo et al. | |
| 5,710,970 A * | 1/1998 | Walters et al. | 725/87 |
| 5,721,815 A | 2/1998 | Ottesen et al. | |
| 5,724,646 A * | 3/1998 | Ganek et al. | 725/89 |
| 5,729,280 A * | 3/1998 | Inoue et al. | 725/101 |
| 5,761,607 A | 6/1998 | Gudesen | |
| 5,771,009 A * | 6/1998 | Nakaya | 709/231 |
| 5,793,971 A * | 8/1998 | Fujita et al. | 725/101 |
| 5,805,154 A | 9/1998 | Brown | |
| 5,850,218 A * | 12/1998 | LaJoie et al. | 725/8 |
| 5,884,141 A | 3/1999 | Inoue et al. | |
| 5,920,861 A | 7/1999 | Hall et al. | |
| 5,930,493 A * | 7/1999 | Ottesen et al. | 725/92 |
| 5,940,738 A * | 8/1999 | Rao | 725/103 |
| 5,966,440 A | 10/1999 | Hair | |
| 5,991,811 A * | 11/1999 | Ueno et al. | 709/231 |
| 6,014,706 A * | 1/2000 | Cannon et al. | 709/231 |
| 6,041,161 A | 3/2000 | Okamoto et al. | |
| 6,078,958 A * | 6/2000 | Echeita et al. | 709/226 |
| 6,091,455 A * | 7/2000 | Yang | 375/240.01 |
| RE36,801 E | 8/2000 | Logan et al. | |
| 6,097,435 A * | 8/2000 | Stanger et al. | 375/240.03 |
| 6,163,272 A | 12/2000 | Goode et al. | |
| 6,177,931 B1 | 1/2001 | Alexander et al. | |
| 6,185,360 B1 * | 2/2001 | Inoue et al. | 386/46 |
| 6,201,536 B1 * | 3/2001 | Hendricks et al. | 715/716 |
| 6,208,799 B1 | 3/2001 | Marsh et al. | |
| 6,209,024 B1 | 3/2001 | Armstrong et al. | |
| 6,229,895 B1 | 5/2001 | Son et al. | |
| 6,233,389 B1 | 5/2001 | Barton et al. | |
| 6,233,607 B1 | 5/2001 | Taylor et al. | |
| 6,233,735 B1 * | 5/2001 | Ebihara | 725/101 |
| 6,240,553 B1 | 5/2001 | Son et al. | |
| 6,253,375 B1 | 6/2001 | Gordon et al. | |
| 6,263,504 B1 * | 7/2001 | Ebisawa | 725/101 |
| 6,266,481 B1 | 7/2001 | Lee et al. | |
| 6,282,207 B1 | 8/2001 | Lerman et al. | |
| 6,305,017 B1 | 10/2001 | Satterfield | |
| 6,314,572 B1 | 11/2001 | LaRocca et al. | |
| 6,314,573 B1 | 11/2001 | Gordon et al. | |
| 6,314,575 B1 | 11/2001 | Billock et al. | |
| 6,327,418 B1 | 12/2001 | Barton | |
| 6,370,688 B1 * | 4/2002 | Hejna, Jr. | 725/101 |
| 6,374,336 B1 * | 4/2002 | Peters et al. | 711/167 |
| 6,418,557 B1 * | 7/2002 | Otani | 709/231 |
| 6,434,748 B1 | 8/2002 | Shen et al. | |
| 6,445,872 B1 | 9/2002 | Sano et al. | |
| 6,446,130 B1 | 9/2002 | Grapes | |
| 6,487,722 B1 * | 11/2002 | Okura et al. | 725/40 |
| 6,502,139 B1 * | 12/2002 | Birk et al. | 709/233 |
| 6,510,555 B1 * | 1/2003 | Tsurumoto | 725/92 |
| 6,542,695 B1 | 4/2003 | Akiba et al. | |
| 6,594,826 B1 * | 7/2003 | Rao et al. | 725/95 |
| 6,668,377 B1 * | 12/2003 | Dunn | 725/92 |
| 6,701,528 B1 * | 3/2004 | Arsenault et al. | 725/89 |
| 6,760,917 B2 * | 7/2004 | De Vos et al. | 725/94 |
| 6,826,775 B1 * | 11/2004 | Howe et al. | 725/40 |
| 6,853,728 B1 | 2/2005 | Kahn et al. | |
| 6,986,156 B1 | 1/2006 | Rodriguez et al. | |
| 6,990,676 B1 * | 1/2006 | Proehl et al. | 725/40 |
| 7,143,430 B1 | 11/2006 | Fingerman et al. | |
| 7,171,677 B1 * | 1/2007 | Ochiai | 725/80 |
| 2001/0003099 A1 * | 6/2001 | Von Kohorn | 463/40 |
| 2002/0059618 A1 * | 5/2002 | Venter | 725/87 |
| 2002/0083438 A1 | 6/2002 | So et al. | |
| 2002/0100052 A1 | 7/2002 | Daniels | |
| 2002/0174438 A1 | 11/2002 | Cleary et al. | |
| 2003/0052905 A1 | 3/2003 | Gordon et al. | |
| 2004/0148634 A1 * | 7/2004 | Arsenault et al. | 725/89 |
| 2005/0144641 A1 | 6/2005 | Lewis | |
| 2005/0183127 A1 | 8/2005 | Ngo et al. | |
| 2007/0280629 A1 | 12/2007 | Hayashi | |

OTHER PUBLICATIONS

Leibowitz. Dennis H.; *Cable TV and New Media: Law & Finance*; Media Law Publishing Corp.; Apr. 2000; vol. XVIII, No. 1; 6 pages.

Leibowitz, Dennis H. "Interactive TV: Turning Couch Potatoes into Mouse Potatoes" Law & Finance section of Cable TV and New Media, Apr. 2000, 6 pages, vol. 18, No. 1, Media Law Publishing Corp.

Ciciora, Walter et al., "Modern Cable Television Technology: Video, Voice, and Data Communications", Morgan Kaufmann Publishers, Inc., 1999, Chapter 16, pp. 659-688.

\* cited by examiner

PRE-STORING MULTIPLE PROGRAMS WITH USER CONTROL OF PLAYBACK

This application claims the benefit of U.S. Provisional Application No. 60/159,202 filed on Oct. 13, 1999; U.S. Provisional Application No. 60/159,469 filed on Oct. 13, 1999; U.S. Provisional Application No. 60/163,324 filed on Nov. 3, 1999; U.S. Non-Provisional application Ser. No. 09/687,151 filed on Oct. 12, 2000; and U.S. Provisional Application No. 60/275,496, filed on Mar. 13, 2001, all of which are incorporated herein by reference.

BACKGROUND OF THE INVENTION

This invention relates in general to content delivery and, more specifically, to delivering a program to an individual business or a residence.

Content is delivered by satellite, microwave, UHF, VDSL, optical fiber, VHF, or cable to the set top boxes of users in a number of different ways. Most content is available according to a linear schedule published in programming guides. Certain additional services are available with some of these delivery systems, for example, pay per view (PPV), video on demand (VOD) and near video on demand (NVOD). PPV allows a user to purchase the right to view a program according to a linear schedule. VOD provides the ability to view a program at any time with control of the playback by the user. NVOD is a hybrid approach where a program is available on a number of channels in a linear program with staggered start times, but the user cannot control playback.

PPV, VOD and NVOD store the content remote from the user for delivery on a dedicated or shared channel. PPV and NVOD are broadcast according to a linear schedule and multiple users share that single channel to view the program simultaneously. Because the single channel is shared, no user can control the playback of the content. In contrast, conventional VOD is singlecasted on a dedicated channel available to a single user, which allows control of the playback. For example, a user can start, stop, rewind, fast forward, or pause a VOD program.

SUMMARY OF THE INVENTION

The invention relates to a method for receiving a program by a user location. The program is sent from a content provider. In one step, at least a first segment of each of a first number of programs sent from the content provider before any user request for any of the first number of programs is recorded. The user request for one of the first number of programs is detected. At least a second segment of each of a second number of programs sent from the content provider is also recorded if the user request is not detected before a stagger period expires. The one of the first number of programs is recorded if the user request is detected before the stagger period expires.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set for in the appended claims.

The present invention provides a program to a user location. A user can watch a program with control over playback without a dedicated channel to the set top box. Through use of a remote control, for example, the user can rewind, fast forward or pause playback of the linearly scheduled program to provide video on demand-like (VOD-like) functionality. To facilitate this feature, a portion of the program(s) is prestored locally before the user decides to view the program(s). After the program is selected for playback, the remaining portion(s) are downloaded from near video on demand (NVOD) lineups, for example.

In one embodiment, an additional content provider allows users to view a predetermined linear schedule of programming on their television. The linear schedule of programming provided to the user can be watched in real-time, i.e., as the program is broadcast. In this embodiment, a subset of the users who subscribe to the additional content may also subscribe to an additional level of benefits, hereinafter called the "club." The club members can also access a subset of or all of the linearly scheduled content at any time. The club members can rewind, fast-forward or pause playback of this content in VOD-like fashion with their remote controls. In some embodiments, this VOD-like functionality does not require club membership or may be paid for an individual program where VOD-like functionality is desired.

Figure 1:
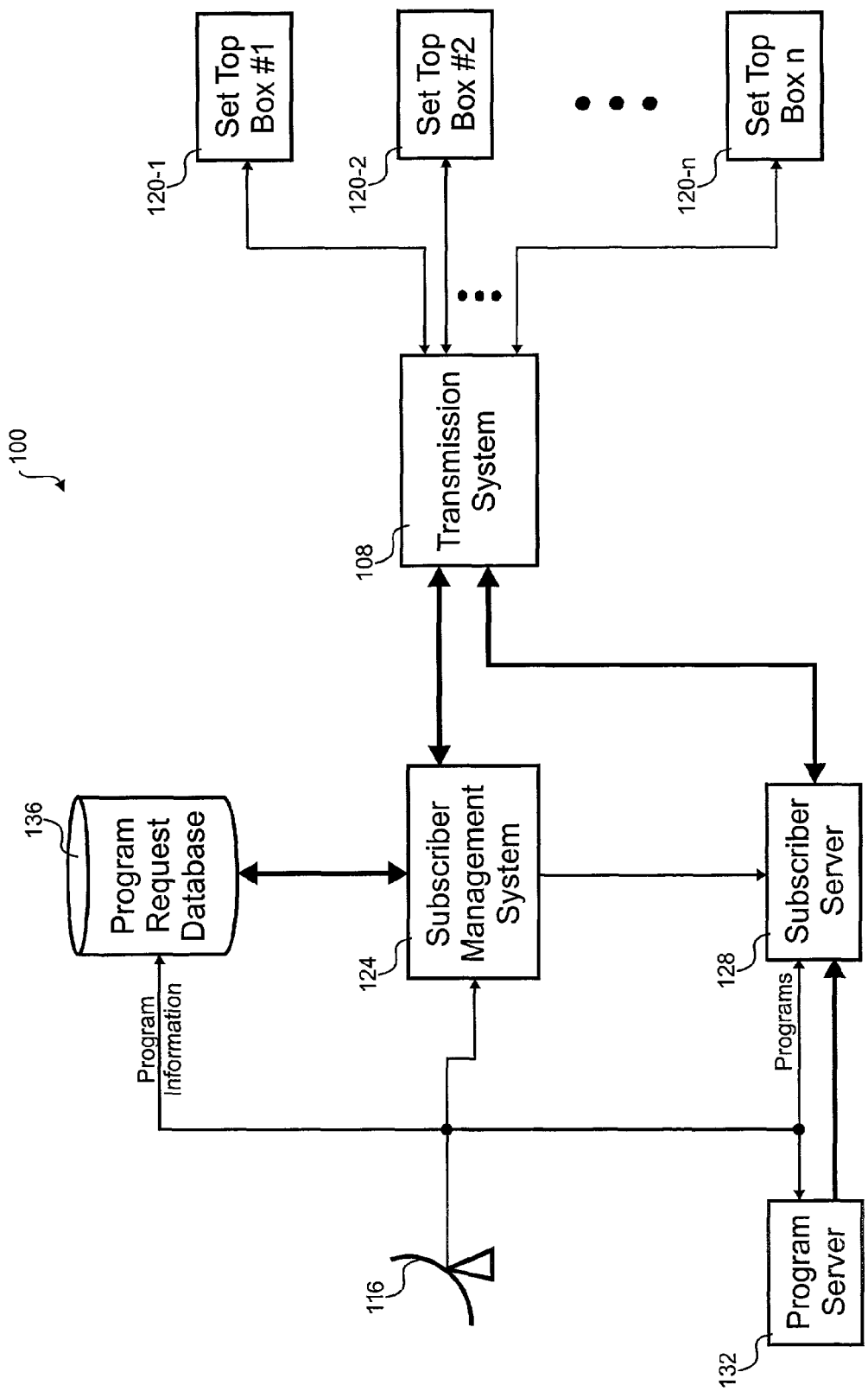
FIG. 1 is a block diagram that shows an embodiment of a program delivery system.

FIG. 1 shows a block diagram of one embodiment of the program delivery system 100. The program delivery system 100 includes a transmission system 108, set top boxes 120, a subscriber management system 124, a subscriber server 128, a program server 132, a program request database 136, and a satellite dish 116. The program server 132 and the program request database 136 are part of a system of an additional content provider. The additional content provider system interfaces with the other components that are part of a system of a cable television provider.

The subscriber management system 124 contains account information for all users such as customer names, addresses, set top box addresses, credit history, subscription status, and VOD status. This information is used to enable programs on the set top box(es) 120 of each user. Interactive screens for selecting services are formulated by the subscriber management system 124. The screens allow the user to select additional products or services. From the satellite dish 116, the subscriber management system 124 receives program information relating to any downloaded programs or realtime programs that are made available to the program delivery system 100.

The subscriber server 128 stores content that is provided to the transmission system 108 for distribution to the set top boxes 120. Programs are stored in compressed digital form. Preferably, MPEG-2 compression is used, although, other embodiments could use different algorithms such as MPEG-4. The programs are downloaded from the satellite dish 116 for later broadcast or are provided on removable storage media such as tapes or disks. Additionally, real-time content is provided to the subscriber server 128 for immediate broadcast from sources such as the satellite dish 116 or a broadcast television antenna.

The cable television provider interacts with the systems of additional content providers in order to supply additional programs to users. This additional content could include commercial supported channels, commercial-free channels, home shopping, interactive services, pay-per-view (PPV), VOD, or NVOD. In this embodiment, a program request database 136 and program server 132 respectively provide additional information to the cable television provider for billing, for example, and content to the cable television provider for broadcast to specific set top boxes 120. An interface standard or custom software allows interaction between the systems of the additional content provider and the cable television provider. Interaction between the systems allows communicating program, billing and other information.

The subscriber management system 124 interacts with the program request database 136 in order to provide program entitlement to users. The program request database 136 stores user specific information, club specific information and programming information. The user specific information includes such things as name, address, set top box address, membership privileges, membership history, and available credit. The club specific information includes such things as program listings and descriptions; coming attractions, premieres and specials; a membership history summary; and program usage by class of program. For real-time broadcasts, the programming information includes such things as schedules, program descriptions and upcoming specials.

The user specific information, club specific information and programming information are available to the subscriber management system 124 for accounting purposes and for formulating the menu screens presented to the user. For example, the user may want to know their account balance or the number of times certain classes of programs were viewed. Additionally, some embodiments can limit the amount of times a user can replay a program during a defined period or number of uses in a period. This usage information is stored in the program request database 136 and used by the subscriber management system 124 before entitling a set top box 120 to watch a program.

The program server 132 stores programs associated with an additional content provider. The subscriber management system 124 checks with the program request database 136 to determine if a program is available. The program server 132 can load the programs onto the subscriber server 128 or directly couple the program to the transmission system 108. Accordingly, the subscriber management system 124 uses the information from program request database 136 in order to entitle the program for the users.

The transmission system 108 takes the various programs and multiplexes them onto a conduit coupled to the set top boxes 120. Typically, frequency division multiplexing techniques are used in order to transmit the various program streams onto a single coaxial cable, an optical fiber or a combination thereof. The transmission system 108 may include analog to digital converters, digital compression hardware, multiplexers and other items in order to make the best use of the available bandwidth. The subscriber management system 124 controls the transmission system 108 to route the appropriate program streams to the desired set top box 120 of the user. Although not shown in the figure, a node can be interposed between the transmission system 108 and the set top box 120 as is well known in the art.

Although the program request database 136 is separate from the subscriber management system 124 in the above embodiment, some embodiments could combine these functions. Program information could be provided to the subscriber management system 124 for management from there with appropriate software and hardware.

Figure 2:
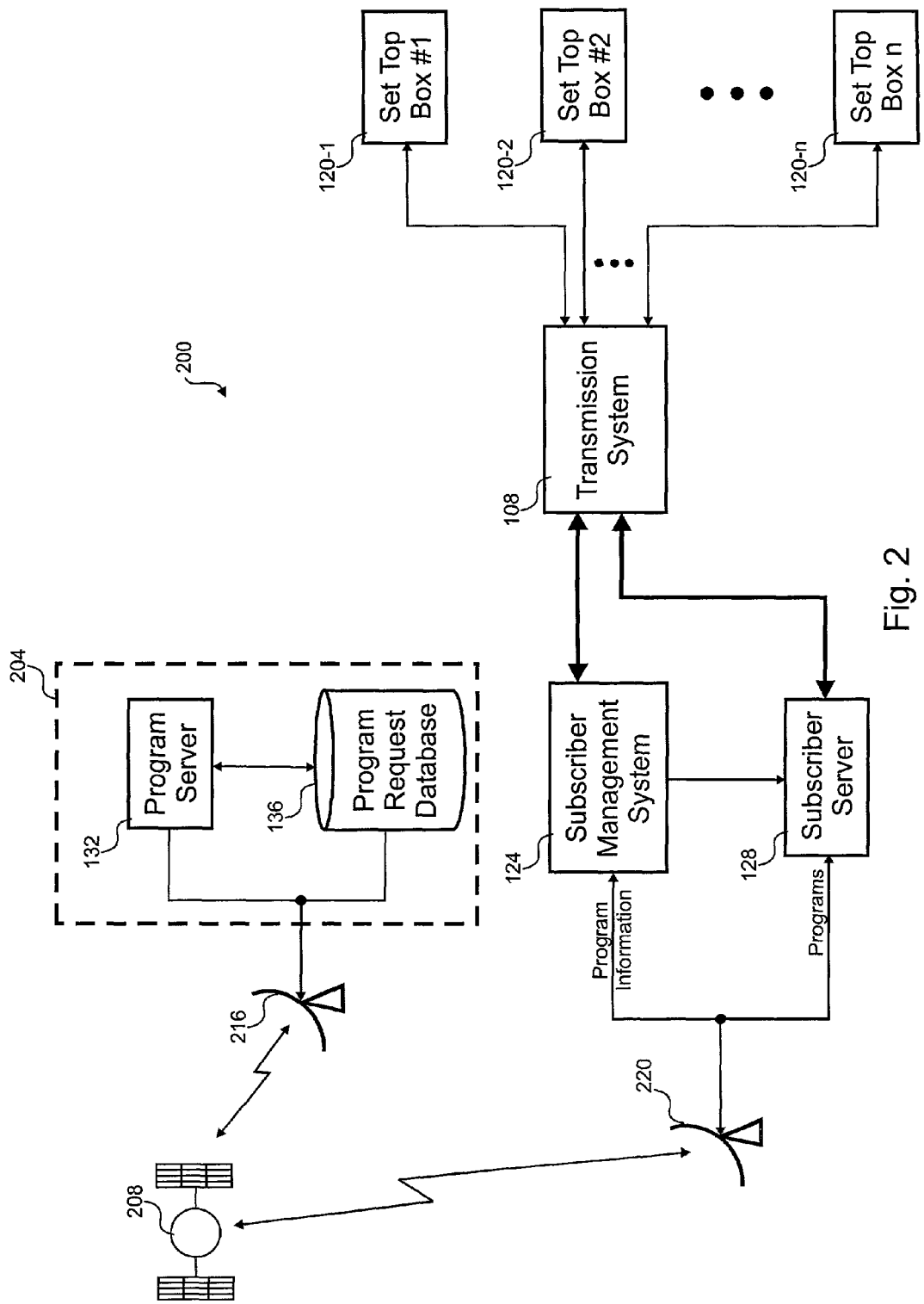
FIG. 2 is a block diagram illustrating another embodiment of a program delivery system that remotely locates an additional content provider away from a cable provider.

With reference to FIG. 2, another embodiment is shown which separates the additional content provider system 204 from the cable television provider system. This embodiment allows the additional content provider to have a central location that could communicate with a number of cable television providers in remote geographical locations. A first and second satellite dishes 216, 220 communicate through a satellite 208. The satellite 208 provides bi-directional communication such that the subscriber management system 124 can interact with the program request database 136 and the program server 132 can send the program to the subscriber server 128 or send the program to the set top boxes 120 using the transmission system 108.

Figure 3:
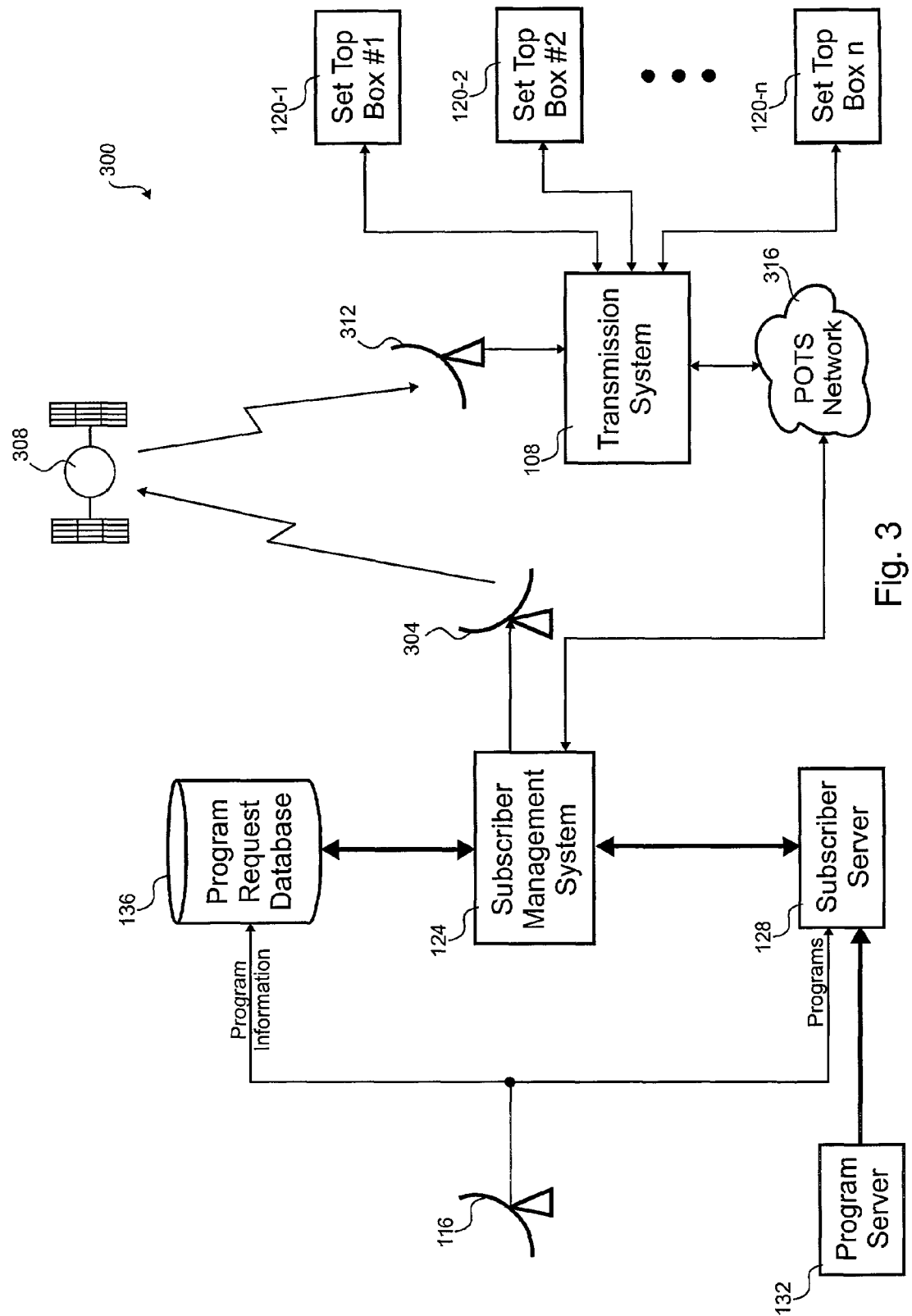
FIG. 3 is a block diagram depicting one embodiment of a program delivery system that wirelessly passes content from a cable television provider to a transmission system.

Referring next to FIG. 3, an embodiment of a program delivery system 300 is shown which uses a satellite link to receive the program. A satellite television provider uplinks the program with a first satellite dish 304 to a satellite 308. A transmission system 108 is coupled to a second satellite dish 312 in order to downlink the program. The transmission system 108 converts the signal from the satellite to a format understood by the set top boxes 120. Although not shown in FIG. 3, other satellites, cables, microwave dishes, and antennas could provide the program to the transmission system 108 for distribution to the set top boxes 120.

Control information passes between the subscriber management system 124 and the set top boxes 120 by way of either a plain old telephone service (POTS) network 316, a control data channel to each set top box 120 or a bi-directional satellite link. Data is sent to the set top box 120 by way of the control data channel, and data is received from the POTS network 316. Rather than reporting usage in near real-time, the POTS network 316 operates in a "store and forward" mode where the set top box 120 reports usage according to a predetermined schedule such as the middle of every night. Alternatively, the subscriber management system 124 could periodically query the set top boxes 120 through the POTS network 316.

Figure 4:
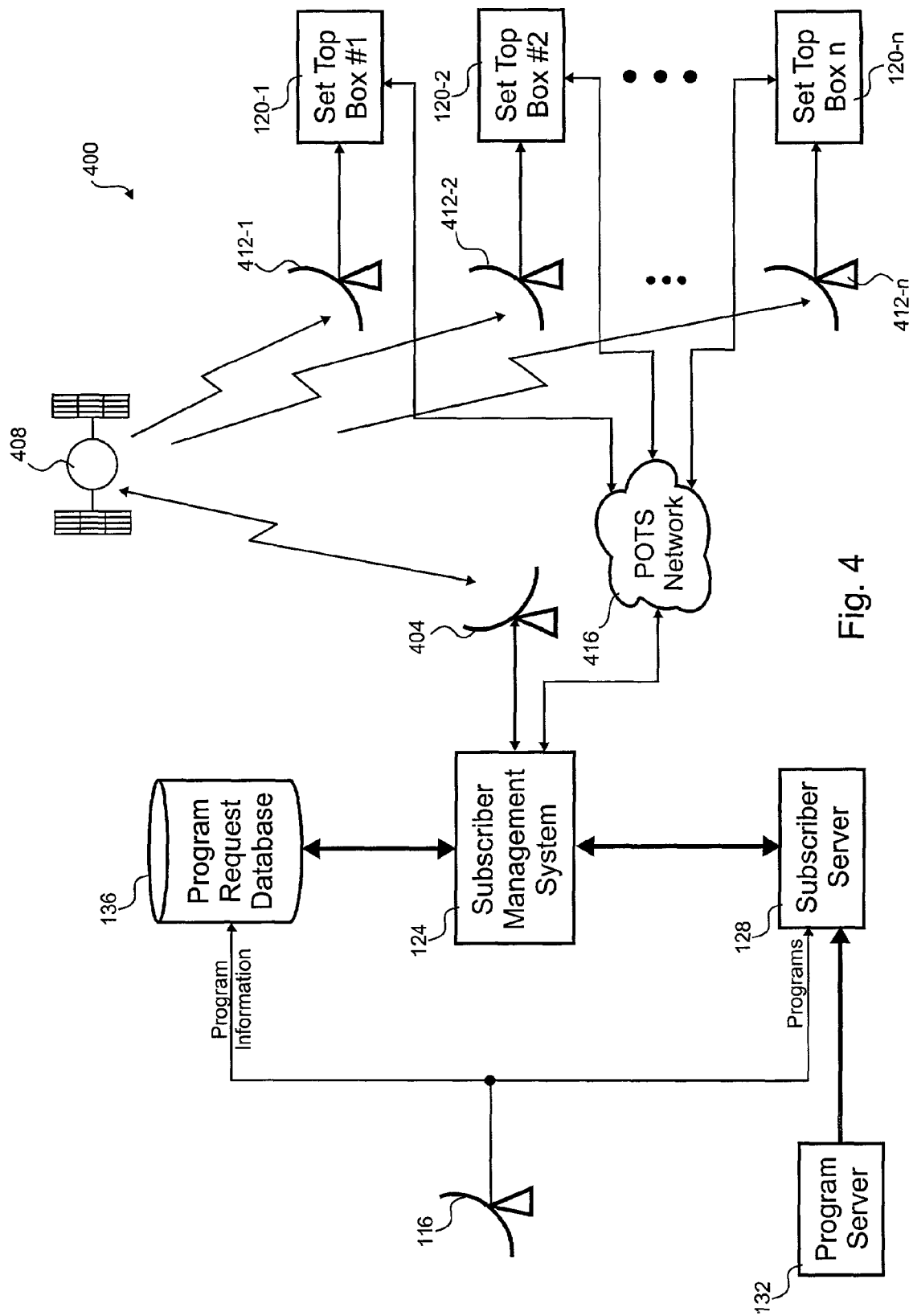
FIG. 4 is a block diagram showing an embodiment of a program delivery system that uses a satellite based transmission system.

With reference to FIG. 4, another embodiment of a program delivery system 400 is shown which places the transmission system 108 in a satellite 408. Although only one satellite television provider is shown, multiple satellite television providers could uplink to the satellite 408. A transmission system in the satellite 408 combines programs from a number of content providers and downlinks the combined signal to satellite dishes 412 for each user. The set top boxes 120 decode the downlinked signal.

A modem transceiver in each set top box 120 communicates over a POTS network 416 to the subscriber management system 124 in order to provide entitlement and other information. This embodiment uses the POTS network for bi-directional communication in near real-time. Once a program that requires special authorization is requested, the subscriber management system 124 is queried for entitlement. In contrast, other embodiments could use broadband packet switched networks for this communication such as the Internet.

Figure 5:
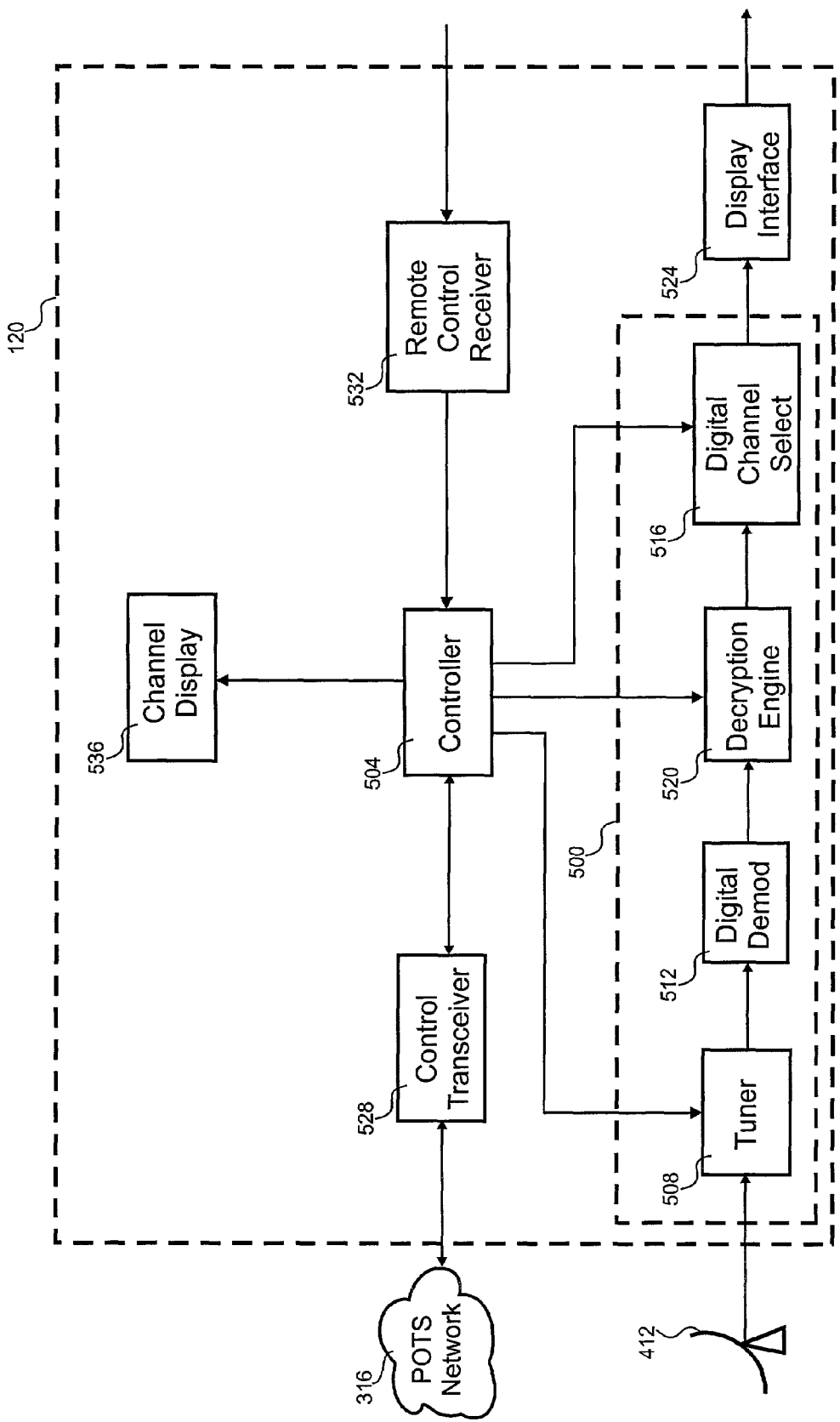
FIG. 5 is a block diagram illustrating an embodiment of a set top box that includes a control channel.

Referring next to FIG. 5, an embodiment of a set top box 120 is depicted in block diagram form. The set top box 120 recovers a digital channel and presents the digital channel to the television on a display channel selected by the user. The set top box 120 includes a program receiver 500, a controller 504, a display interface 524, a control transceiver 528, a remote control receiver 532, and a channel display 536. Included in the program receiver 500 are a tuner 508, a digital channel demodulator 512, a digital channel select circuit 516, and a decryption engine 520. The set top box 120 receives programs from the satellite dish 412 that is coupled to the satellite, but other embodiments could use other transmission methods. Control information is sent and received through the POTS network 316 or other bi-directional channel.

The program receiver 500 selects the desired digital channel from the frequency division multiplexed signal received from the transmission system 108. A control signal, which corresponds to a particular carrier channel to be downconverted, is sent from the controller 504 to the tuner 508. The tuner 508 downconverts a selected carrier to an intermediate frequency (IF) carrier. The signal modulating the IF carrier is converted into a digital baseband signal by the digital demodulator 512 whose output is an encrypted MPEG signal. The decryption engine 520 performs decryption of the digital baseband signal to produce a plaintext signal. A key is provided from the controller 504 to enable this decryption. A number of digital channels are interleaved in the plaintext signal through a process called statistical multiplexing. Under the direction of the controller 504, the desired digital channel is removed from the plaintext signal by the digital channel select circuit 516. To allow demuxing the desired digital channel, the program identifiers (PIDs) unique to each digital channel are monitored. At this point, the digital channel is compressed in an MPEG-2 format.

The final step before the program is in a format suitable for display on a television involves decompressing the digital channel in the display interface 524. An MPEG-2 decoder in the display interface 524 decompresses the digital channel to an NTSC format modulated at frequency that typically corresponds to channel three or four. The television is tuned to channel three or four to receive the program contained in the digital channel. As is well known in the art, the television can also select a composite video or S-video from a composite video or S-video input port in order to receive the program from the set top box 120.

The controller 504 oversees the operations of the set top box 120. The controller 504 performs all processing input from a remote control, selecting the carrier channel and digital channel and processing control information. The controller 504 includes a look-up table that maps the digital channels and their corresponding carrier channels to display channels. The user can select a display channel in order to view the corresponding content of the digital channel on their television. By using the look-up table, the controller 504 causes the set top box 120 to tune and decode the digital channel selected by the user with the remote control.

When a program is requested by the user, the subscriber management system 124 finds an available transmission pathway and provides the display channel to the user. When ready to begin viewing, the user requests the display channel with the remote control. The set top box appropriately tunes and decodes the digital channel which corresponds to that display channel. In other embodiments, the controller 504 can remap a digital channel to any display channel such as a dedicated club channel.

Control information is sent and received by the control transceiver 528 through the POTS network 316. For example, the set top box 120 may request a program through a control data channel of the transceiver 528 and the subscriber management system 124 may respond with a display channel for that program. This transceiver 528 includes a modem that modulates data onto the phone line and demodulates data from the phone line. The controller 504 processes all data sent to and received from the control transceiver 528 on the control data channel. Other embodiments could bi-directionally communicate through a packet switched network, cellular data network, wired control channel, microwave link or other known methods.

During playback of a club program, the user can pause, rewind or fast-forward the program with their remote control. The club program is sent to the set top box 120 of the user over a dedicated digital channel. The playback commands are sent through the control data channel to the subscriber management system 124 which controls the subscriber server 128 or program server 132 in order to regulate playback. In this way, a club program can be played back much like a video or audio tape locally playing in the VCR or cassette player of the user.

The remote control receiver 532 allows the user to input information into the program delivery system 100. Using the remote control, the user sends selections according to menu prompts on the television screen. The controller 504 processes these selections and formulates appropriate prompts after receiving information from the subscriber management system 124. The prompts can be produced by the controller 504 and/or the subscriber management system 124. These prompts allow the user to select a club program for playback or to otherwise access their account.

The channel display 536 provides the user with the desired display channel. This display 536 could be a LED display, a LCD display or an overlay displayed on the television screen. The user uses the feedback from the channel display 536 to confirm which display channel is currently selected.

Figure 6:
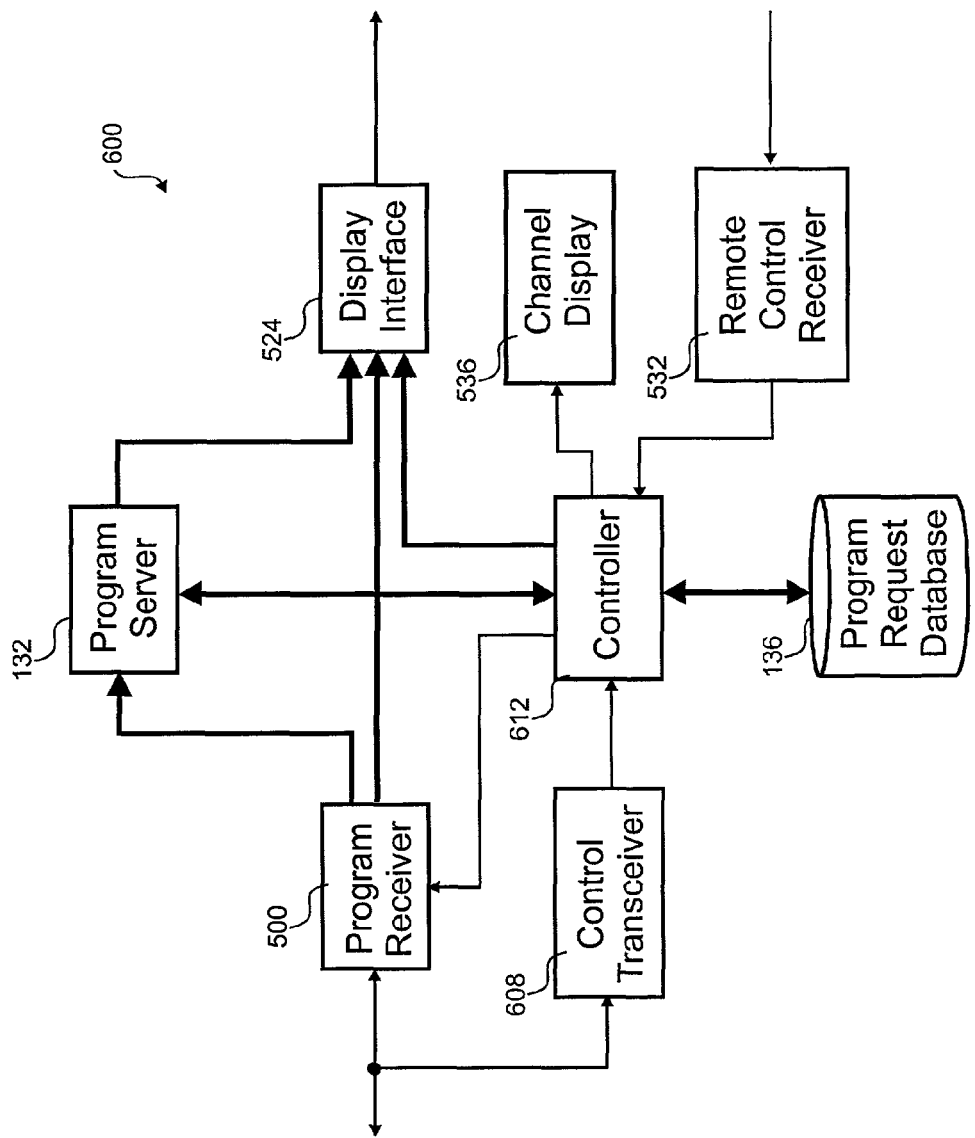
FIG. 6 is a block diagram illustrating another embodiment of a set top box that has content storage capability.

Referring next to FIG. 6, an embodiment of the set top box 600 is shown which stores some programs locally. This embodiment includes a controller 612, the receiver 500, the display interface 524, the program server 132 and the program request database 136. Club programs are periodically downloaded and stored in the program server 132. This embodiment receives programs through a coaxial cable coupled to the transmission system 108. Additionally, control information is sent and received over this cable.

The controller 612 manages the operation of the set top box 600. Digital channels are selected by the controller 612 and downloaded to the program server 132 for later viewing or sent directly to the display interface 524 for real-time viewing. The controller 612 also retrieves user specific information, club specific information and programming information from the program request database 136 in order to entitle the club programs stored on the program server 132.

A mass storage device, such as a magnetic disk, tape drive, video recorder, optical disk or the like, in the program server 132 stores the downloaded programs. Local storage allows pausing, rewinding and fast-forwarding the program with reduced latency. Inexpensive magnetic disks today have eighty gigabytes of data storage which allows roughly the same amount of hours of video programming storage or fifteen hundred hours of audio programming in the set top box 600. It is to be understood, that the storage device in some embodiments may hold information other than club related programs.

Control information is sent and received by the control transceiver 608. This transceiver 608 demodulates the incoming control data channel which has a carrier typically in the range of 100 MHz and modulates an outgoing control data channel at a carrier frequency which has a carrier typically at 5-50 MHz. The controller 612 processes all data sent to and received from the control transceiver 608 on the control data channel.

The control data channel is broadcast to all set top boxes 120 associated with the delivery system 100. In order to avoid other boxes 120 acting upon control information addressed to the desired set top box 120, control information is addressed for an identification number unique to the desired set top box 120. Additionally, cryptology could be used upon the control information to provide further security from unintended boxes 120 decoding the control information.

Figure 7:
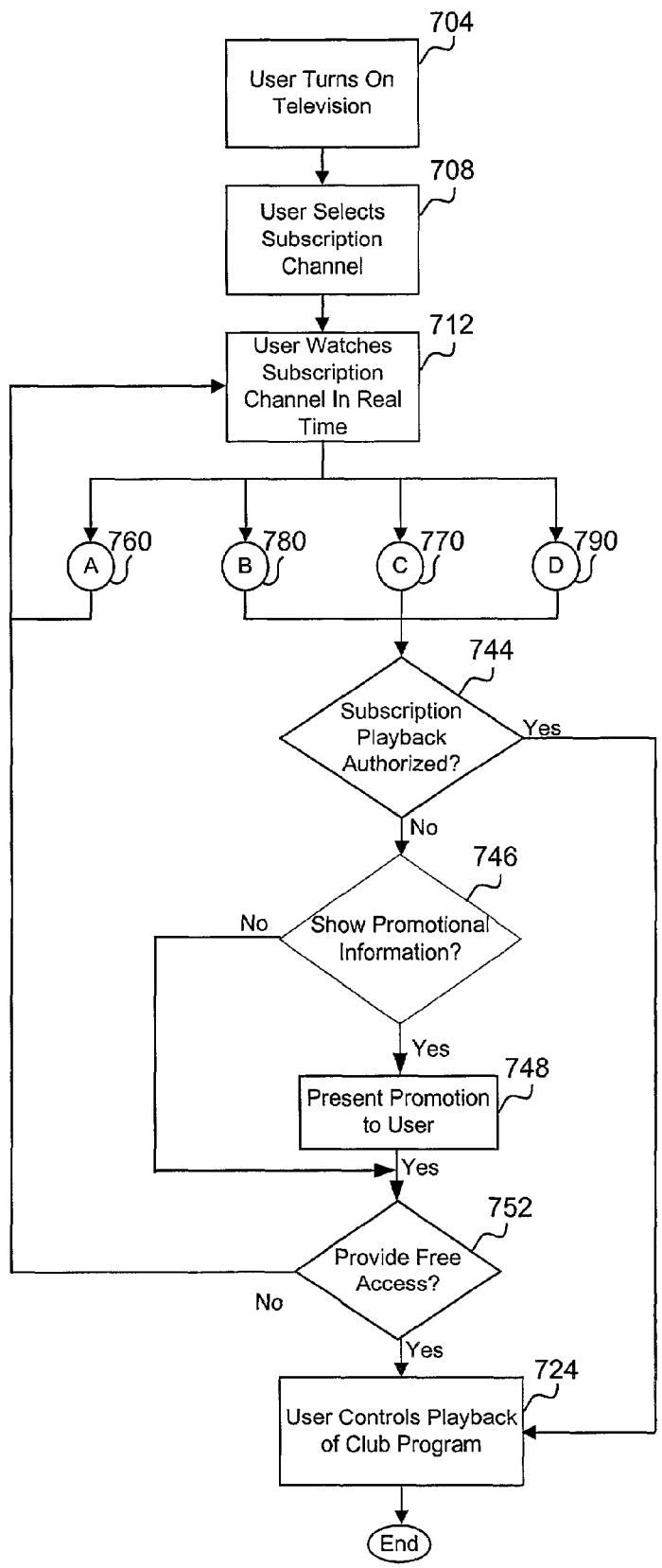
FIG. 7 is a flow diagram that shows a process for either retrieving real-time programs or previously stored programs.

Referring next to FIG. 7, a flow diagram is shown which demonstrates a method for either retrieving real-time programs or previously stored programs. The flow diagram of FIG. 7 incorporates various retrieval embodiments and notification embodiments, as illustrated by the elements "A," "B," "C," and "D," which are shown individually with greater detail in FIGS. 7A-7D. The real-time programs may be part of a general subscription service that includes a fixed schedule of programs played throughout a given time period, such as a month.

Control of playback for stored programs is usually available only to those in the club. Club membership is generally an added service beyond that available simply from belonging to the subscription service, and is typically more costly to the user than is the subscription service alone. However, other embodiments could provide the privileges of club membership without requiring belonging to the subscription service. For example, commercially supported television could have the ability to be paused, rewound and fast-forwarded instead of a subscription service. A further example, discussed in greater detail below, includes providing samples of the more versatile club service to non-club-members as a marketing strategy.

The process begins with the user turning on the television set and set top box 120 in step 704. If desired, the user selects to view a display channel which corresponds to the subscription service in step 708. To enable this selection, the controller 612 is informed of the user's choice by the remote control receiver 532. In response, the controller 612 refers to the look-up table of channels (i.e., the channel map) and commands the receiver 500 to process the corresponding digital channel. The digital channel is sent to the display interface 524 for decompression before being displayed on the television. Coincident with displaying the digital channel, the channel display 536 is updated by the controller 612 to reflect the selected display channel.

At step 712, the subscription program is playing at its previously scheduled time for the user. A notification service, shown generically as step 760, may be implemented automatically by the system to provide information to the user to regarding whether the subscription program is a club program permitting enhanced features for club members. Additionally, the controller 612 monitors for any of a variety of commands (shown generically as steps 770, 780, and 790) that may be activated by the user and which may be used to provide controlled viewing access to a previously stored club program. The stored club program to which controlled access is granted may be the selection currently being shown in step 712 or may be a different club program, as described below.

If the controller detects entry of one of the commands, it determines in step 770, 780, or step 790, as appropriate, whether or not to authorize playback control of a club program selection. At step 744, the system makes use of that determination either to grant the user playback control at step 724 or, in some embodiments, to decide whether to show promotional information at step 746. If a decision is made to show such information, the promotional feature is presented to the user at step 748. Such a promotional feature may include information describing the enhanced benefits of club membership, the additional cost of club membership, and any other relevant information such as special promotional rates.

One particular aspect of the promotional feature may include a complimentary access to the club benefits that the user attempted to access in step 770, 780, or 790. Whether to grant such complimentary access is determined at step 752, and the decision may be made by having the subscriber server 128 access information from the subscriber management system 124. Examples of information that may be relevant in determining whether to grant complimentary access, among others, include whether such complimentary access has ever previously been granted to the particular user, how long the particular user has been a subscriber, and whether the user is delinquent in any payments.

If the system determines that complimentary access should not be granted, it returns to step 712 where the user remains watching the subscription channel in real time. In one embodiment, this entire process may be completely transparent to the user. From the user's perspective, his attempt to access a restricted club feature may have had no effect on the program stream at his television because the program he is watching is not a club program or because he is not a club member. If, instead, the system determines that complimentary access should be granted, it provides the user with playback control of the club program at step 724. Regardless whether the user is granted playback control at step 724 as a complimentary promotional feature or as part of the user's club membership, such control may be provided either from the beginning of the selected program or from the point in the program at which a command was entered, depending on the precise determination made in step 770, 780, or 790.

Once authorization is approved, an entitlement is sent to the set top box 120, 600 by the subscriber management system 124 or the controller 612. Among other things, the entitlement includes carrier and digital channel information corresponding to the club program. The controller 612 commands the receiver 500 to recover the digital channel which contains the club program and to present that digital channel to the user. No matter how the user is ultimately granted playback control of a club program at step 724, the same capabilities are provided by the system. At step 724, the user can pause, rewind or fast-forward the program just as if it were being played in a VCR of the user. The user could be given a limited amount of time to view the club program in order to preserve the resources required for a digital channel dedicated to that user alone. In other words, in such an embodiment, the user is given a predetermined amount of time to view the club program such as twice the length of the program. Beyond the predetermined time, the program cannot be restarted.

Figure 7A:
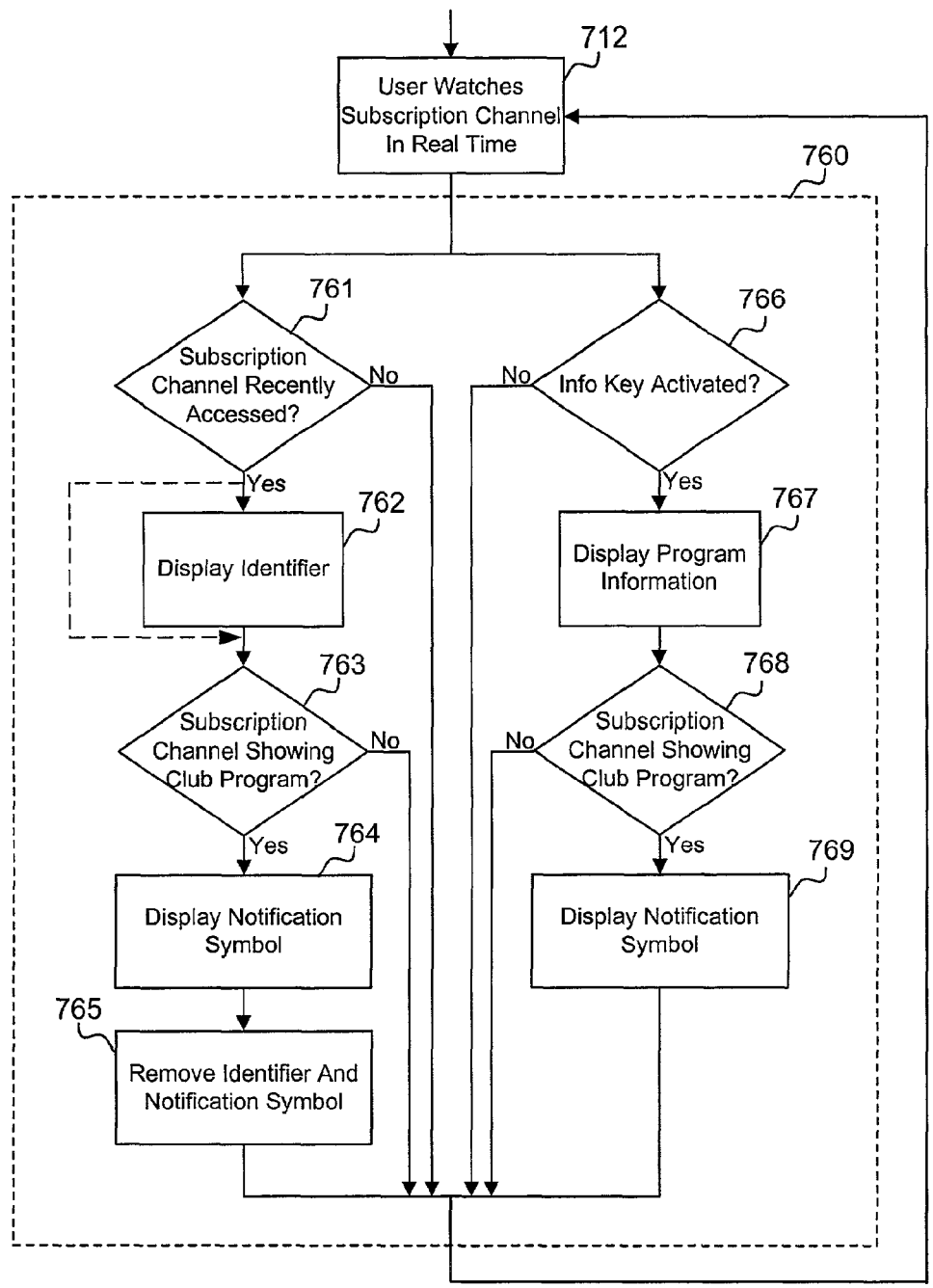
FIG. 7A is a flow diagram showing the interaction of a notification feature with the retrieval of real-time programs or previously stored programs.

One aspect of the club notification feature is shown in detail in FIG. 7A, which illustrates the functioning of step 760. Variations of such a notification feature, some of which are described below, are also within the scope of the invention. The controller 612 generally monitors as the user moves through different channels, waiting for the user to settle on a particular subscription channel at step 712. Whether the user has settled on that channel may by determined, for example, at step 761 by the fact that the user has stayed on that channel for a certain period of time (e.g., five seconds).

If the user has not just recently accessed the subscription channel, the system simply continues to provide that channel to the user in real time at step 712. However, an identifier may be displayed at step 762 where the user has just settled on that channel. At step 762, the identifier is displayed relatively briefly (e.g., 2-6 seconds) so as not to interfere with viewing the program. In one embodiment, such an identifier may simply identify that the user is now accessing his subscription service. In more elaborate embodiments, the identifier may include dynamically generated information indicating, for example, the title of the program being shown and the time remaining in the program. In an alternative embodiment, indicated by the dashed line, the identifier is not displayed at all, the process proceeding instead directly to step 763.

At step 763, a determination is made whether the program being shown on the accessed subscription channel is a club program. If not, the system returns to showing the program at step 712 and removes the identifier after the appropriate time period. If a club program is being displayed, then a club notification symbol is shown on the identifier at step 764. In the embodiment shown with the dashed line, the club notification symbol is shown by itself rather than in conjunction with the identification symbol. Such a club notification symbol may comprise, for example, a special icon or alphanumeric string recognizable to a club member or other subscriber to denote that the special playback control is available. In certain embodiments, the same icon that is used in other aspects of the system described below, such as in a programming guide or in various menu functions, is used. Such consistency reinforces the meaning of the notification symbol, serving both to sharpen its recognition value and to increase its effectiveness in advertising the special club features. Unlike a static icon, the club notification symbol is included on a dynamic basis that reflects ongoing changes in the roster of club programs. The overlaid identifier and notification symbol remain displayed for a brief period (e.g., between 2 and 6 seconds), and are then removed at step 765 so that the user may continue to watch the subscription channel without distraction at step 712. In certain embodiments, display of the identifier and notification symbol may be repeated periodically, such as at 15-minute intervals.

The controller 612 also monitors at step 766 whether a designated information key is activated by the user. Such an information key is used to bring up information on the screen that describes the program currently being shown. Such program information may include, for example, the title of the program, a brief description of the program, the time of day that the program began, the total time remaining to be shown in the program, a content rating for the program, and a quality rating for the program. In different embodiments, different combinations or subsets of such information may be used. In response to activation of the designated information key, the controller 612 directs display of the program information on the user's television screen at step 767.

At step 768, a determination is made whether the program being shown on the subscription channel is a club program. If so, a notification symbol is overlaid with the program information at step 769 so that the display of program information includes such an indication that the playback control features for that program are available to club members. In one embodiment, the notification symbol is the same icon that may be displayed at step 764 and at other points in the operation of the system, thereby reinforcing the interpretation of the icon to subscribers. Display of the notification symbol is determined dynamically to reflect the fact that the club programs are subject to change on an ongoing basis. The program information display, including the notification symbol, may be removed by the user, through the controller 612, by again activating the designated key.

Figure 7B:
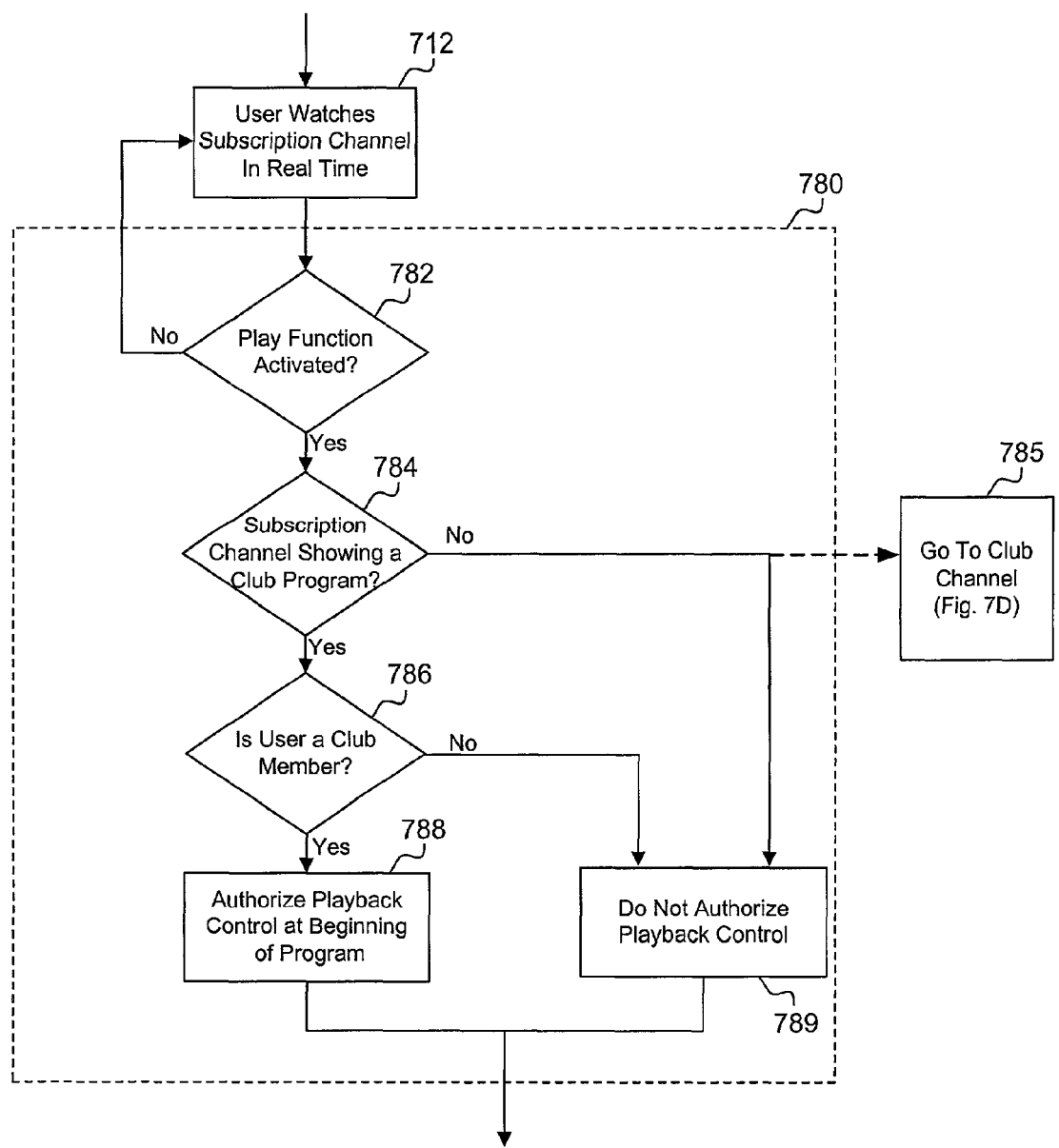
FIG. 7B is a flow diagram showing one embodiment for retrieving a previously stored program.

One method for activating user playback control of a club program is shown in FIG. 7B, corresponding generally to step 780. In this instance, the controller 612 monitors in step 782 whether the PLAY key or its equivalent is activated by the user. The PLAY key is used as a simple single-key means for selecting the scheduled program currently showing and accessing the stored club program from its beginning. Such a feature allows a user to respond to seeing a program that is in progress by issuing a demand for immediate access to the entire program.

Activation of the key indicates to the controller 612 that the user has initiated a request for access to a club version of the present subscription program. Processing of that request proceeds at steps 784 and 786 to determine (1) whether the subscription channel is showing a club program and (2) whether the user is a member of the club and therefore entitled to access to the previously stored club version. Authorization to access the club version from its beginning is granted at step 788 only if both conditions are true. Authorization may be obtained by querying the controller 612 in some embodiments, while in other embodiments it may be obtained by querying the subscriber management system 124. If either of the conditions is false, authorization is specifically withheld at step 789. Even so, the attempted access has initiated a sequence that may include steps 744, 748, and 752 as described above to grant complimentary access to the club version as a promotional feature. One alternative embodiment is illustrated with the dashed line. Instead of simply withholding authorization for playback control where the subscription channel is not showing a club program, the user is directed to the club channel at step 785, thereby proceeding to steps shown in FIG. 7D.

Figure 7C:
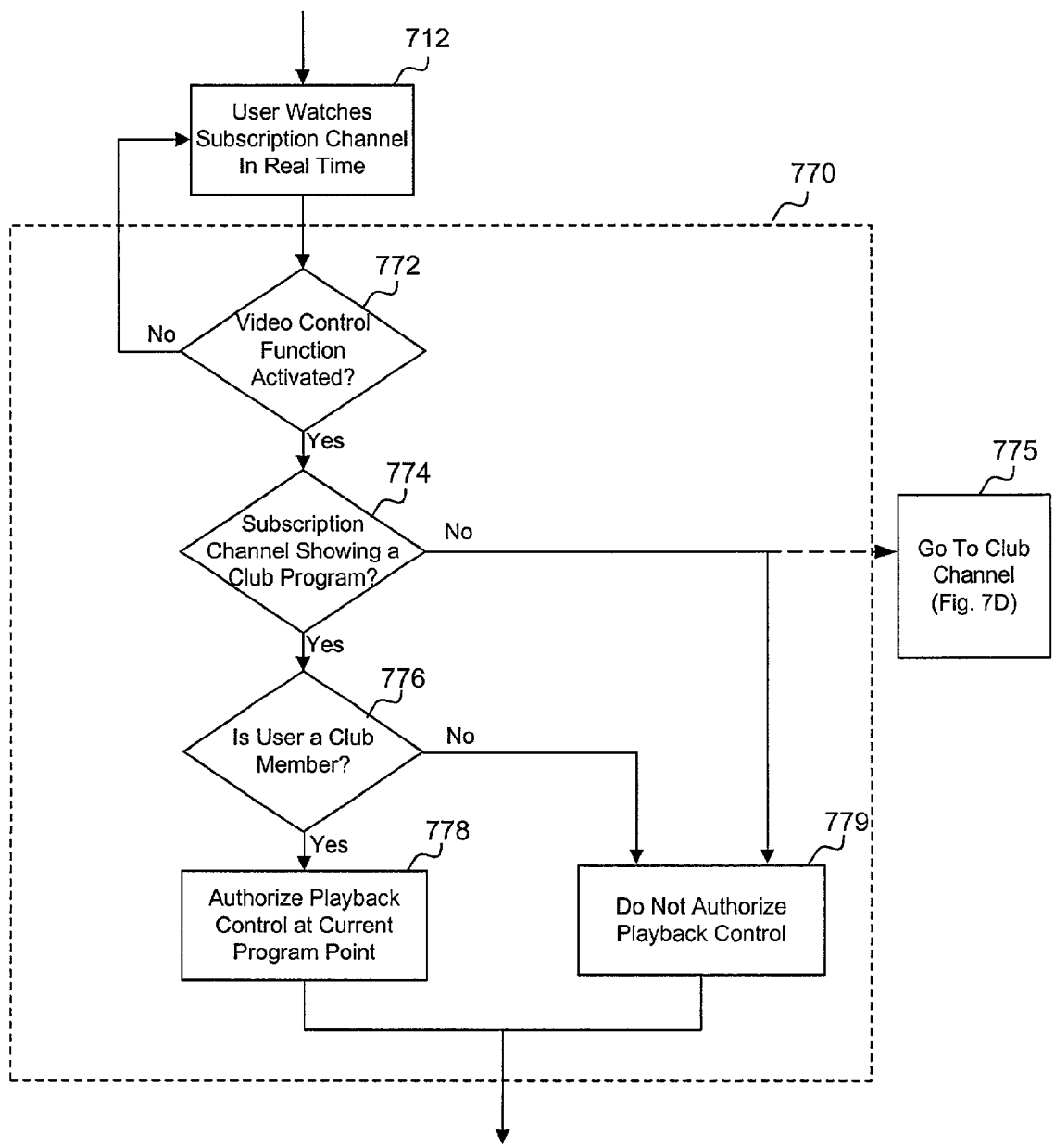
FIG. 7C is a flow diagram showing another embodiment for retrieving a previously stored program.

A similar method for acquiring playback control is shown in FIG. 7C, which corresponds generally to step 770. In this method, the user indicates that he wishes to control the program being shown by activating one of the specific program control keys other than the PLAY key or its equivalent. Such program control keys include those keys that would be used to manipulate the progression of the program if the user had been granted playback control, such as FAST FORWARD, REWIND, or PAUSE, among other playback controls that may be activated. In certain embodiments, the program control keys may include the ability for the user to give graduated instructions, requesting that the FAST FORWARD or REWIND be at a particular rate with respect to the normal propagation speed, such as "2x," "4x," etc.

These authorization conditions may be checked by querying the controller 612 and/or the subscriber management system 124 in various embodiments. After the controller has detected activation of a program control key, a determination is made at steps 774 and 776 of (1) whether the subscription channel is showing a club program and (2) whether the user is a club member. If both conditions are true, playback control of the corresponding club program is authorized at step 778; if either or both of the conditions are false, at step 779 such playback control is specifically not authorized. The lack of such authorization within step 770 may be overridden according to step 752, where it may be determined that complimentary access to the particular club program should be granted as part of a promotional feature. One alternative embodiment is illustrated with the dashed line. Instead of simply withholding authorization for playback control where the subscription channel is not showing a club program, the user is directed to the club channel at step 775, thereby proceeding to steps shown in FIG. 7D.

When authorization is granted at step 778, the controller 612 or subscriber management system 124 determines the current point of playback of the subscription program. This playback time can be determined from the MPEG program stream. For example, using the control data channel, the playback time may be sent to the subscriber management system 124 such that the previously stored on-demand program may be started at step 724 at the current playback point. In this way, the club program is substituted for the scheduled program in a manner transparent to the user—the transition from the scheduled program presentation to the club program appears seamless and with out temporal distortion. From the perspective of the club-member user, he has tuned to a subscription channel, seen a brief notification that the program being displayed, and used his program control keys to control the program as he desires.

Figure 7D:
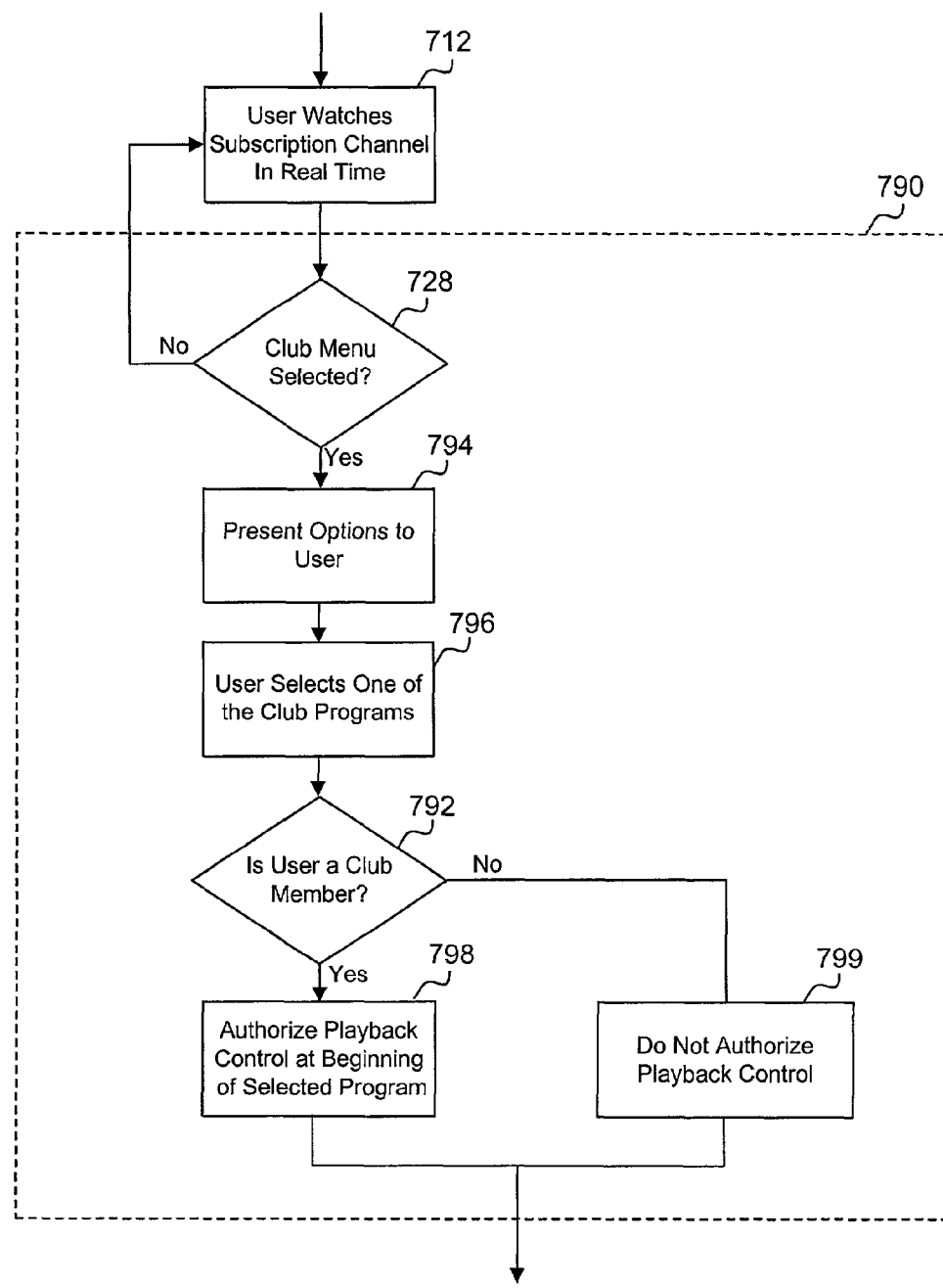
FIG. 7D is a flow diagram showing a further embodiment for retrieving a previously stored program.

There is still a further way in which the user can initiate accessing a stored club program and be given playback control over the program, illustrated in FIG. 7D, which corresponds generally to step 790. In step 728, the user can select to show a club display menu, which presents various program options through an on-screen menu. Such a club display menu may be selected, for example, by activating an appropriate key on a remote control. The menu may be organized according to program genre, alphabetically, or otherwise. At some point, a determination is made whether the user is a club member in step 792, such as by accessing the subscriber management system 124. In the embodiment illustrated in the figure, that determination is made after the user has selected a club program, although it may be performed at other times in different embodiments. If the user is not a club member, authorization to access the club programs is specifically not authorized in step 799, although this may be overridden in step 752 for promotional purposes as previously described.

The user is presented with options for selecting a club program in step 794. In some embodiments, the menu screen is formulated by the controller 612 and sent to the display interface 524. In other embodiments, the on-screen menu is formulated at the subscriber management system 124 and fed to the user over a channel, which may be a digital channel. The same channel that will ultimately play back the club program can be used. The menu that is presented may include a notification symbol, such as the dynamically generated icon used at other points in the system, to emphasize that the program selections offered are specially designated club programs, the complete list of which may frequently change. At step 796, the user selects one of the club programs from the menu of options, and the user's authorization to control playback of that program from the beginning of the program is established at step 798.

Figure 8A:
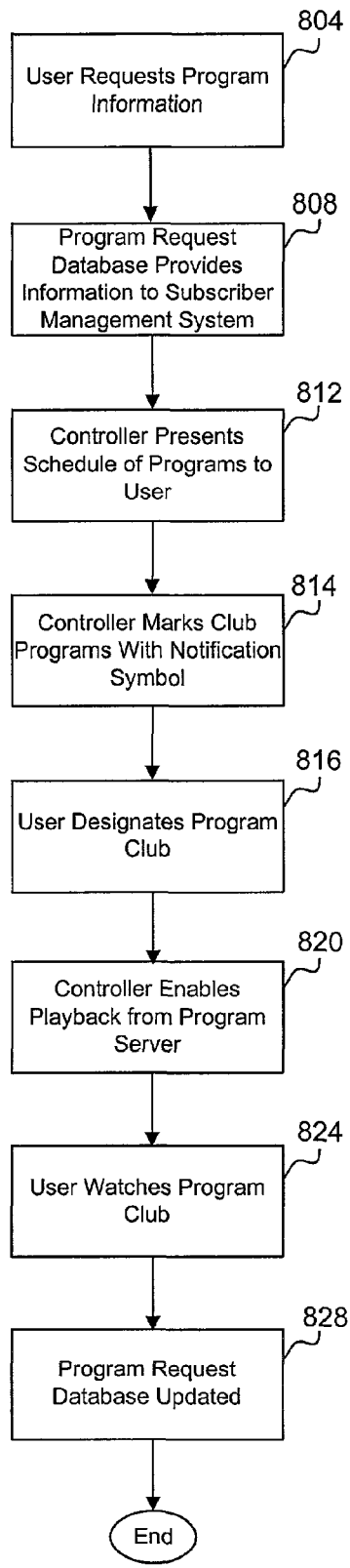
FIG. 8A is a flow diagram that illustrates a process for selecting a previously stored program.

The various embodiments illustrated in FIG. 7-7D make no particular distinction where the club programs are stored. Different possibilities for such storage, all within the scope of the invention, are described in detail above. Briefly, the club programs may be stored remotely, such as in a headend, a neighborhood node, or may be stored locally, such as in the set-top box 600. FIG. 8A is a flow diagram illustrating a particular embodiment for selecting a locally stored club program in the set-top box 600.

In step 804, the user selects a display of linearly scheduled programming. This display is formulated by the controller 612 based upon information retrieved from the program request database 136 in step 808. Certain things relating to billing, for example, may be formulated by the subscriber management system 124 and passed to the controller 612 over the control channel. In step 812, the programs are presented to the user such as in tabular form by channel and scheduled program time. The set top box 120 formulates the display based upon information previously received from the control channel. An example of such a display, based on a linear programming schedule, is presented in FIG. 8B, discussed in more detail below. Other display configurations may also be used, including organizing material by genre, alphabetically, by rating, or otherwise.

According to step 814, the controller marks those programs that are within the club with a notification symbol, such as the icon that is used to designate club programs at various other points in the system. Even in embodiments where the notification symbol takes the form of a display icon, it operates differently than do other icons that may also be incorporated into the program menu. Such other icons are typically limited to static informational designations, indicating, for example, fixed content ratings for each program. This may be accompanied in some instances by an icon that denotes the existence of a parental-lock feature based on the fixed content ratings. By contrast, the club notification symbol is a dynamic designation that seamlessly accommodates the ongoing changes in the roster of club programs that are at least partially stored for VOD-like control over playback. Thus, to include the club notification symbol, the controller 612 consults the program request database 136 and/or the subscriber management system 124.

In step 816, the user designates one of the presented club programs. If necessary, after obtaining entitlement, the controller 612 enables playback of the stored club program from the program server 132 in the set top box 600. The program server 132 stores programs in compressed digital form and spools the digital program to the display interface 524 for decompression and analog conversion. In step 824, the user watches the club program with full control of the playback. In different embodiments, program control is granted from the beginning of the program or is granted according to its position within the linear programming schedule, such as described with respect to FIGS. 7B and 7C above. The program request database 136 is updated with viewing information in step 828. Updating the program request database 136 allows enforcing viewing rules such as not allowing the user to watch the same program more than two, five or ten times. The rules, such as the number of viewings, can be adjusted in various embodiments to comply with contractual obligations with the copyright holder.

Figure 8B:
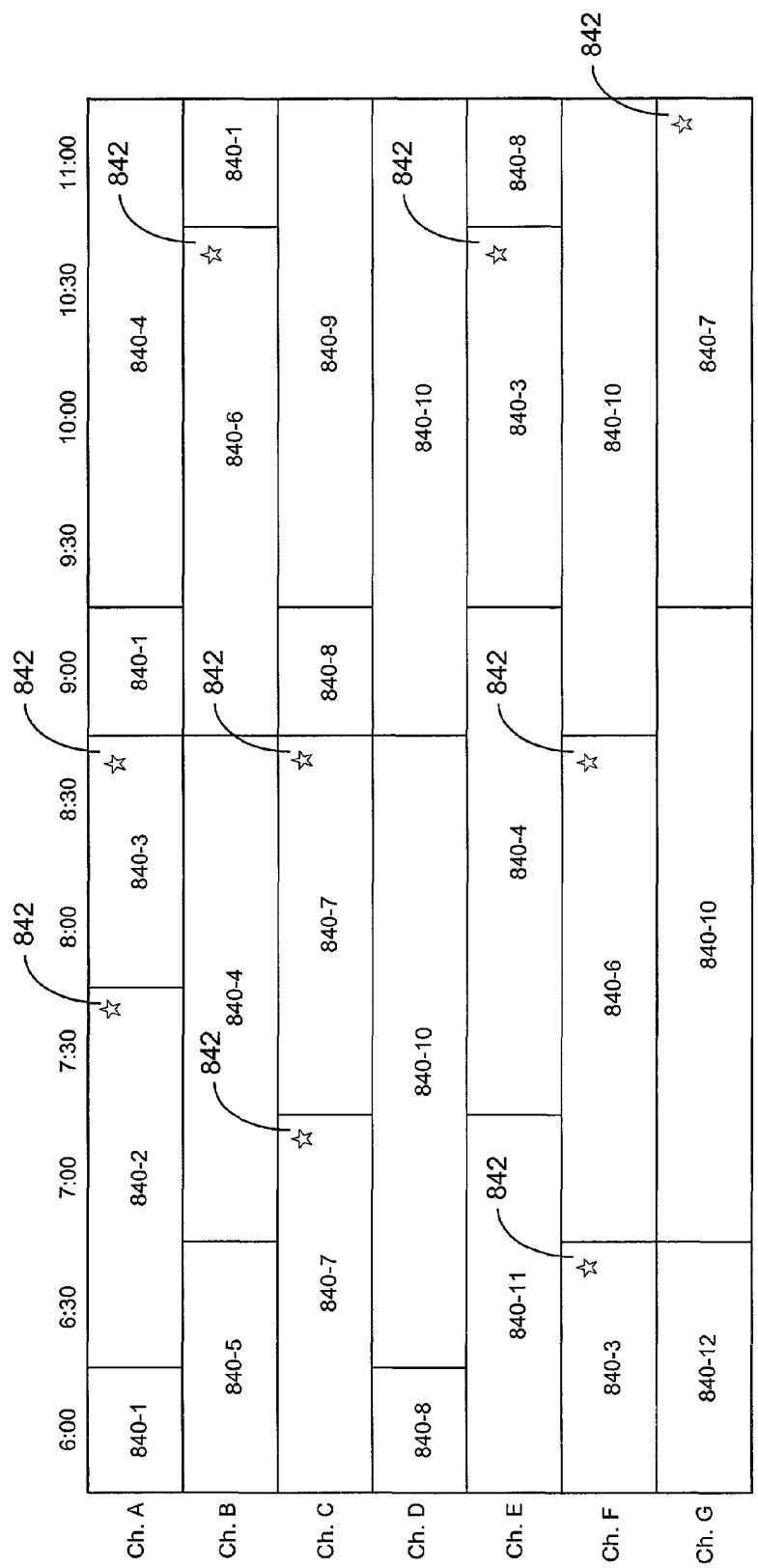
FIG. 8B is a block diagram illustrating one embodiment for coupling a notification feature with a menu-based embodiment.

An example of how an arrangement of programs may appear to the user after step 814 is shown in schematic fashion in FIG. 8B. The example shows a schedule of programs 840 of varying length on seven distinct channels labeled "Ch. A"-37 Ch. G" over a time period from 6:00 to 11:00. The exemplary schedule includes twelve distinct programs 840-1-840-12, repeated and staggered among various of the channels to accommodate different subscriber viewing habits within a fixed schedule. Of the twelve distinct programs, four (840-2, 840-3, 840-6, and 840-7) in this example are within the club and may be accessed with playback control by club members. Accordingly, at every occurrence of such a club program in the schedule, a dynamically generated icon 842 is included to identify the availability of the special club features for those programs.

Figure 9A:
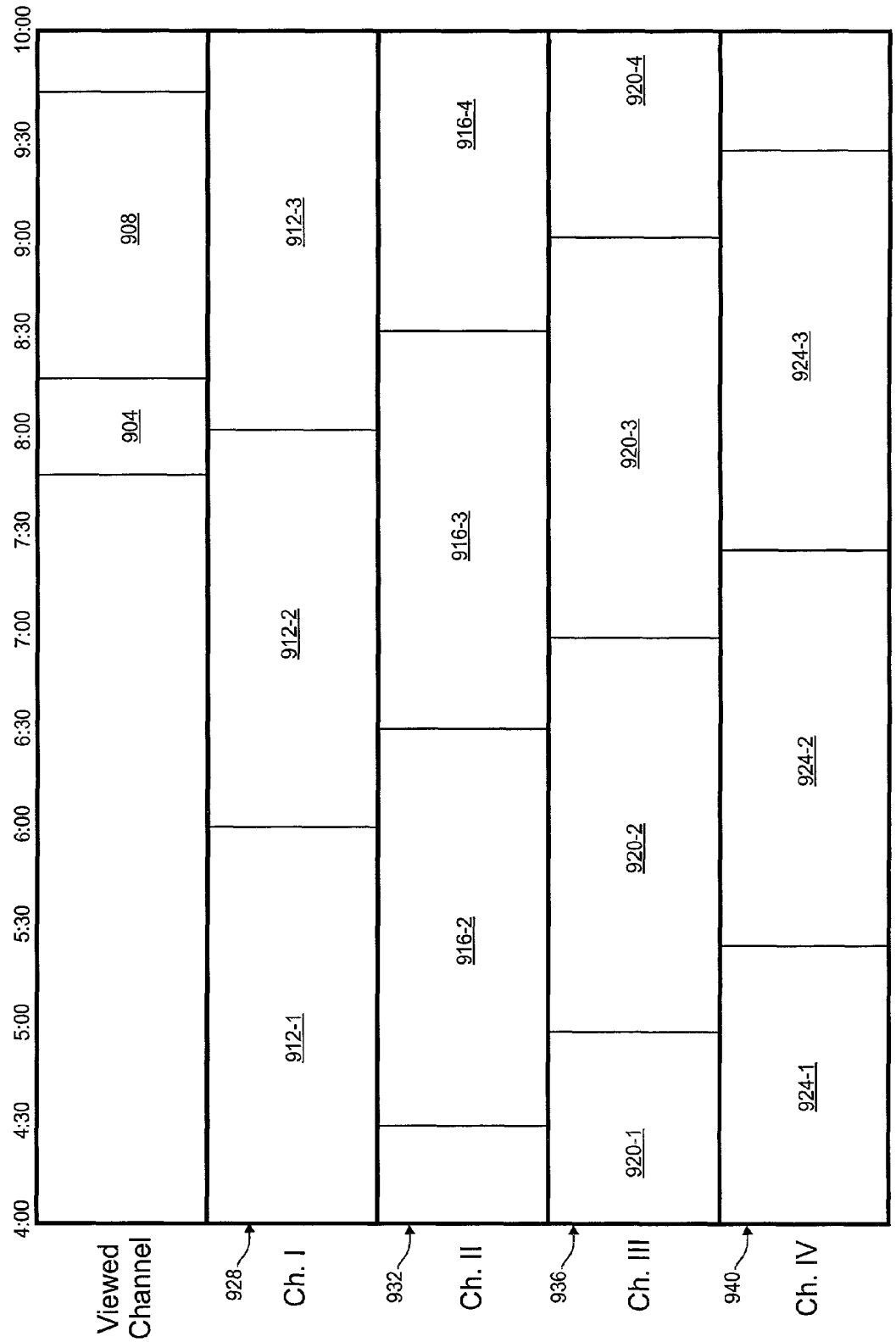
FIG. 9A is a block diagram that shows an embodiment of a viewing of a particular near video on demand (NVOD) program.

Referring next to FIG. 9A, the viewing by the user of a NVOD program is shown. In this embodiment, a two-hour NVOD program is distributed in real-time with start times staggered by a half-hour. In other words, channels I-IV 928, 932, 936, 940 each display the same NVOD program at varying start times. In this way, a user only has to wait a maximum of a half-hour in order to view the next program in the conventional manner. This embodiment improves upon this by allowing the user to begin watching at anytime while enjoying control of the playback.

There are four channels 928, 932, 936, 940 that display the NVOD program in this embodiment. In this embodiment, each channel 928, 932, 936, 940 displays the program a number of times. For example, channel I 928 displays the NVOD program a first time 912-1 at four o'clock, a second time 912-2 at six o'clock and a third time 912-3 at eight o'clock. Channel II 932 has start times that are one-half hour after the start times of channel I 928.

The user in this example desires to begin watching the NVOD program from the beginning at 7:45. The first portion 904 of the NVOD program is stored on the program server 132. This storage occurs the first time the NVOD is played on any of the channels 928, 932, 936, 940. The storage can be either locally in the set top box 120 or remotely from the set top box 120. Only a minimum amount 904 or thirty minutes in this embodiment is stored locally until the user expresses a desire to view the program and/or control playback. Once the user begins watching, the remainder of the program is retrieved from currently running channels 928, 932, 936, 940. In this example, the remaining three-quarters of the program 908 is retrieved from the program that began at seven thirty 924-3 on channel IV 940. To support playing a part of a program while other parts are being stored, the program server 132 can both store programs to and retrieve programs from the server 132 at the same time.

In this embodiment, one half hour 904 is stored locally. However, other embodiments could have more or less channels with more or less pre-storage. The stagger time between program start times is the amount that is stored before viewing. Stagger time is calculated by dividing the program length by the number of channels. For example, if the program is two-hours and is presented on eight channels, the stagger time is fifteen minutes. Accordingly, fifteen minutes would be pre-stored locally.

The embodiment of FIG. 9A, stores a first portion of the program 904 and downloads a second portion 908 from NVOD channels 928, 932, 936, 940. Other embodiments could use other delivery mechanisms to receive a first portion that is stored locally before the program is requested. After a request by the user, the remaining portions could be downloaded from a variety of methods such as a broadband network connection, a VDSL connection, and a satellite TV connection. The broadband network could send the second portion via a DOCIS modem, a DSL modem, a satellite modem, a power line modem, a line of sight modem, a wireless modem or other techniques. In other embodiments, both the pre-stored portion and the remaining portion(s) could be downloaded using methods such as a broadband network connection, a VDSL connection, and a satellite TV connection.

Figure 9B:
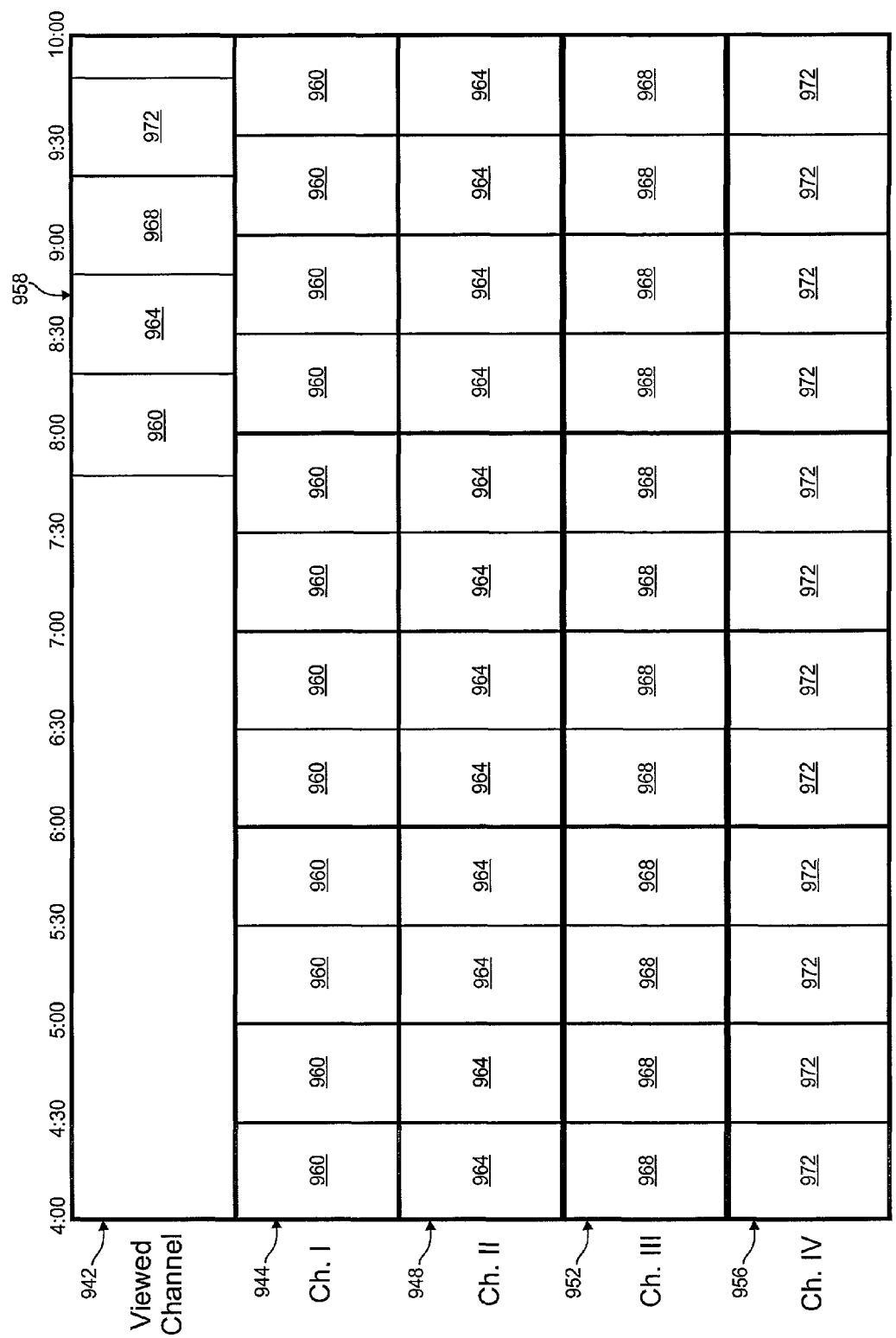
FIG. 9B is a block diagram that shows another embodiment of a viewing of a program gathered from a number channels.

With reference to FIG. 9B, a block diagram shows another embodiment of a viewing of a program 958 gathered from a number channels 944, 948, 952, 956. In this embodiment, four channels 944, 948, 952, 956 repeat their respective half-hour segments 960, 964, 968, 972 of the two hour program 958. A NVOD service could still be provided from the four channels 944, 948, 952, 956 by the set top box 120. Seamlessly, the set top box 120 would switch channels every half-hour such that the program 958 appeared on a single display channel.

To provide the program on the viewed channel 942 with control of playback, the same four channels 944, 948, 952, 956 are used. At some point before the user attempts to view the program 958, the first portion 960 is stored on a mass storage device in the set top box 120. When a request is made for the program 958, the remaining portions 964, 968, 972 are retrieved from their respective channels 948, 952, 956. The remaining portions 964, 968, 972 are gathered either sequentially or in parallel. The user is allowed to control playback in any of the portions that are resident on the set top box 120 even if the whole program 958 has not finished downloading.

Although this embodiment, receives the program portions 960, 964, 968, 972 from analog or digital channels, other embodiments could receive all or some of the portions 960, 964, 968, 972 from other sources. For example, the first portion 960 could be received from a channel, but the remaining portions could be downloaded from a broadband network connection. In another example, the first portion 960 could be downloaded from a broadband network connection and the remaining portions could be received from channels. Further, those skilled in the art will appreciate that any number of channels could be used. The more channels used the smaller the portion size.

Figure 9C:
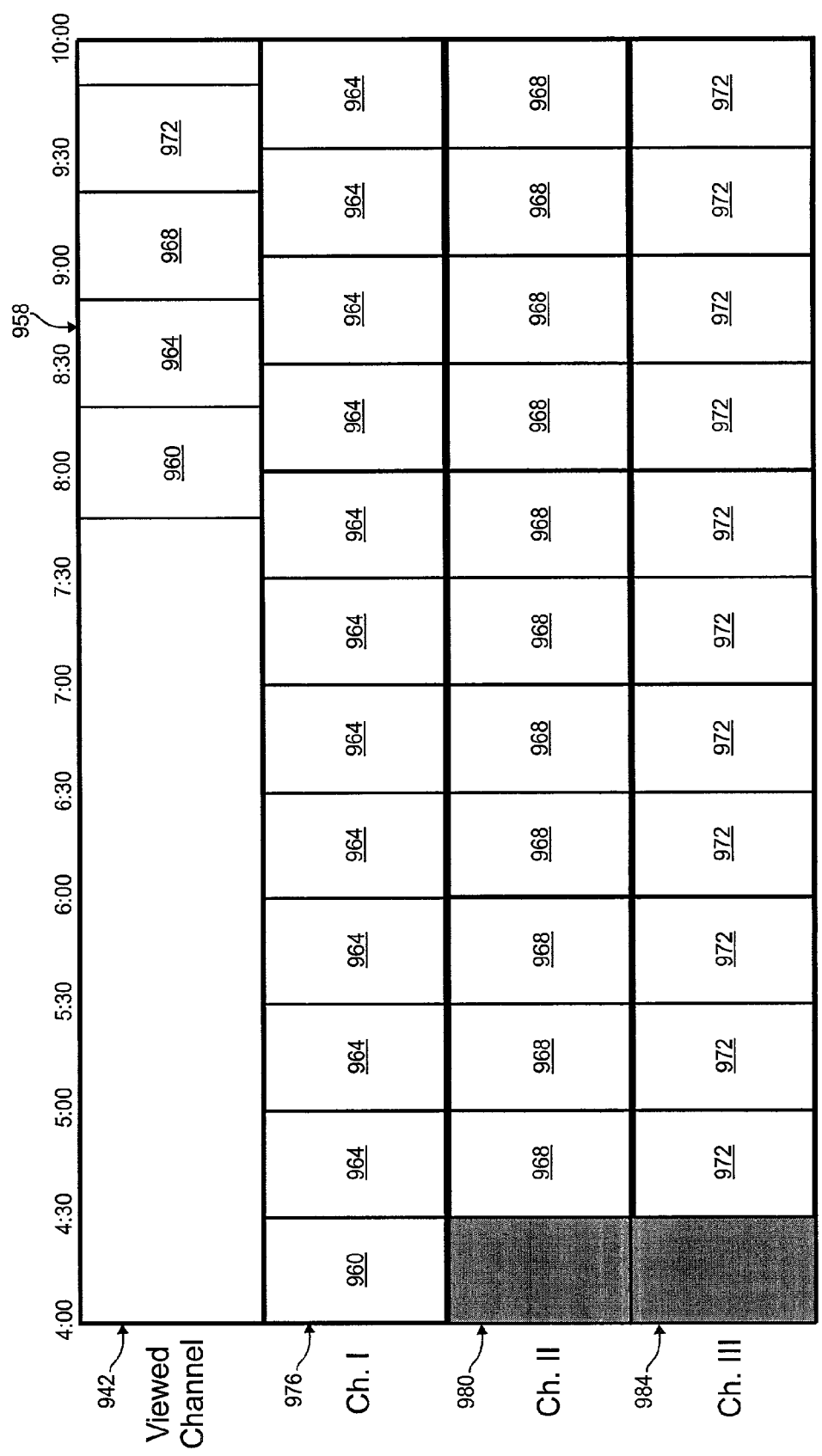
FIG. 9C is a block diagram that shows yet another embodiment of a viewing of a program gathered from a number of channels.

Referring next to FIG. 9C, a block diagram shows yet another embodiment of a viewing of a program 958 gathered from a number of channels 976, 980, 984. This embodiment reduces the number of channels necessary to transmit a program by one. The first portion 960 is broadcast once. All set top boxes 120 in the club record the first portion 960. After the first portion is recorded, the remaining portions 964, 968, 972 play on the reduced number of channels 976, 980, 984. In this way, channel I 976 can replace two channels.

It is to be understood that other embodiments could occasionally repeat the first portion such that resource conflicts, service interruptions and new installations would not prevent storage of the first portion in the set top box. It is to be further understood, that the first portion could be broadcast on a channel that does not later broadcast any remaining portion. The channel could be used for other purposes after delivery of the first portion.

The above embodiments discuss local storage of the program. Local storage could be inside the set top box 120. Additionally, local storage could include a mass storage device that is coupled to the user location. For example, a hard drive could be coupled to the set top box by a firewire interface or a server in the user location could be coupled by a network interface to the set top box. The user location could be a residence or a business and the mass storage device could be either inside or outside the structure of the user location.

Figure 10A:
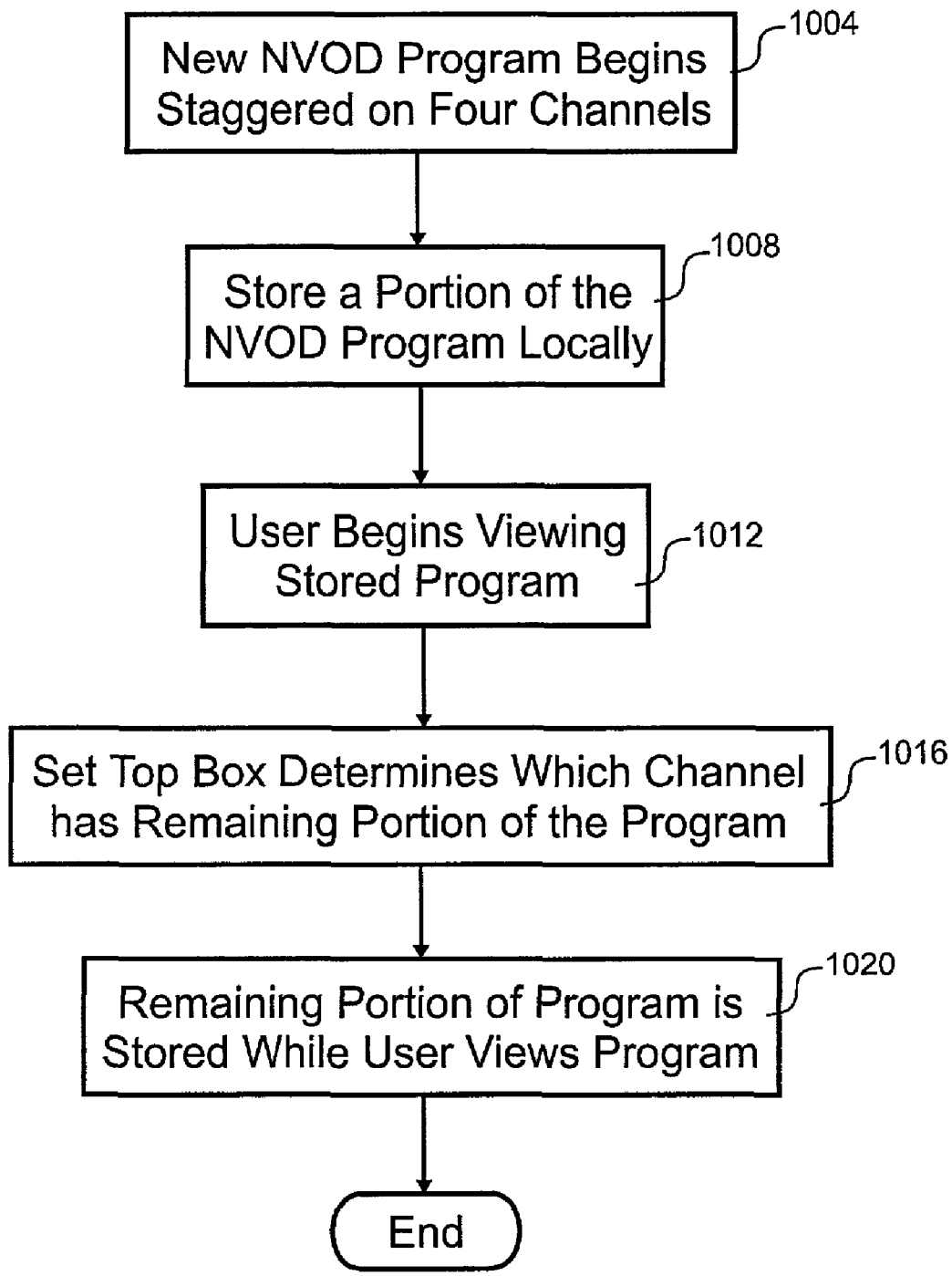
FIG. 10A is a flow diagram that shows the steps in showing a NVOD where the user controls playback.

With reference to FIG. 10A, a flow diagram depicts a process for allowing viewing of NVOD programs under control by the user. In step 1004, a new two hour NVOD program begins on four channels 928, 932, 936, 940 with half-hour staggered start times. In step 1008, a half-hour portion 904 of the NVOD program is stored in the program server 132 of the set top box 600. In step 1012, the user begins viewing the previously stored program 904 from the beginning. In step 1016, the set top box 600 determines the channel 928, 932, 936, 940 that has the remaining portion 908 of the program to allow storage of the remaining portions 908 before the user will need it. In step 1020, the remaining portion 908 of the program is stored on the program server 132.

The embodiment of FIGS. 9A and 10A, stores a NVOD program for later playback. The remaining portion 908 of the program is retrieved from a single digital channel. About eight through fourteen compressed digital channels can be sent down a single 6 MHz carrier channel. Each digital channel, which carries audio and/or video, is differentiated with unique program identifier addresses (PIDs). In order to more quickly retrieve the NVOD program, any of the digital channels that contain information not presently stored could be downloaded from the carrier channel in parallel. For example, if eight digital channels had the same two-hour program playing with start times staggered by fifteen minutes, it would only take fifteen minutes to retrieve the remainder of the NVOD program by retrieving from a number of digital channels simultaneously.

Even if the user has decided not to watch a NVOD program, the program can be stored for later retrieval. Once the last playtime of a NVOD program is begun, the remainder of the program is stored in anticipation of the user later wanting to view the program. If the user does not view the program in a predetermined amount of time or if storage space is needed, the program is erased from the program server 132.

Capacity algorithms could be used to conserve space on the program server 132. For example, a first-in-first-out (FIFO) algorithm could be used to make room for new programs as the program server 132 becomes full. Additionally, a predetermined amount of free space could be reserved for new programs. Further, the user could be prompted such that the user could decide which programs should be retained or removed from the server 132.

The user is informed of the programs for which the playback is controllable. For example, a NVOD program, which has a previously stored portion, would display an icon overlaid on the television screen or on a display. In this way, the user would know when a program can be paused, rewound or fast-forwarded. If the program server 132 is full or if the program is otherwise not available for playback manipulation, the icon would not appear.

Although the above embodiment is discussed in terms of a NVOD cycle, other embodiments could operate differently. For example, the first portion could be recorded the first time a program is played from a NVOD cycle or a broadband network connection. When the user requests to view the program, the remaining portions could be downloaded from a NVOD cycle or a broadband network connection.

Figure 10B:
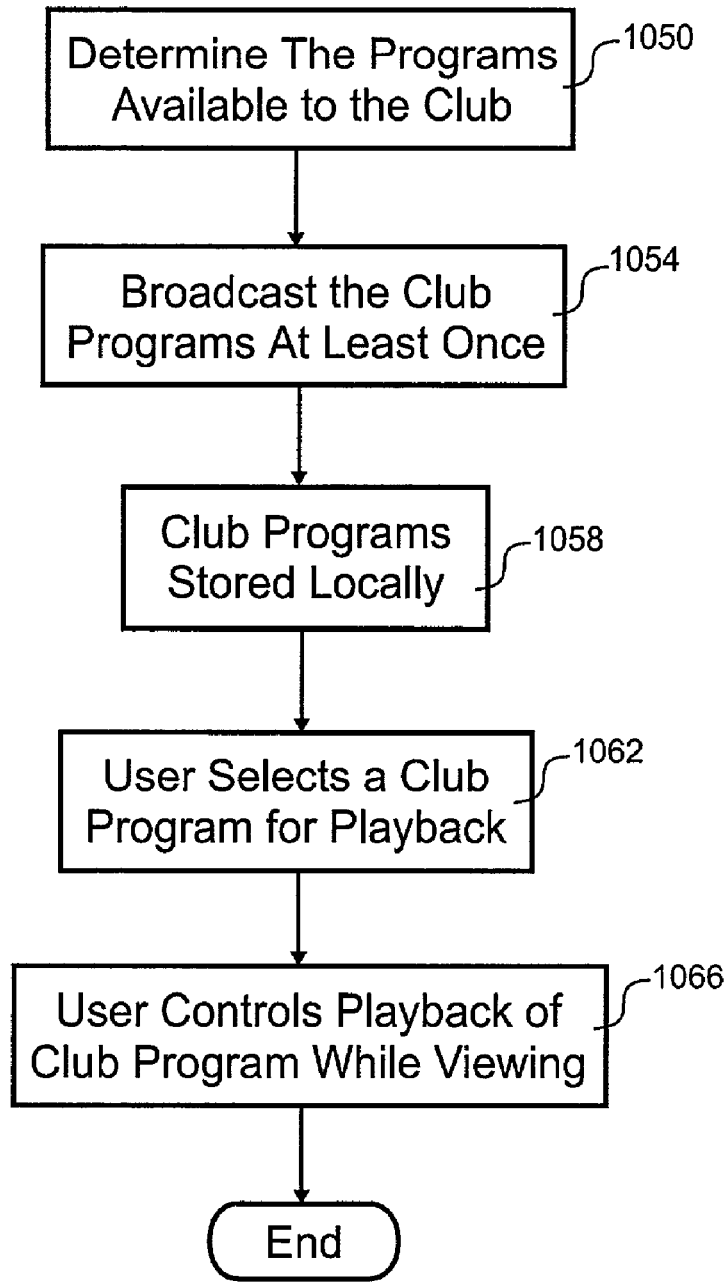
FIG. 10B is a flow diagram that shows a process for pre-storing a club program local to the user.

With reference to FIG. 10B, a flow diagram shows a process for pre-storing a club program at a user location. The process begins in step 1050 where a linear schedule is analyzed to determine which programs to offer to the club with local playback control. Typically, the desirable programs are offered as club programs. Once the club programs are known, this embodiment transfers the whole club program to the user location.

In step 1054, the club programs are broadcast to the club members. The broadcast of this embodiment is over one or more channels. Typically, a time in the middle of the night is used for the broadcast. If the set top box 120 has the capability to record multiple channels at one time, the speed of download can be increased. It is to be understood that other embodiments could use a broadband network connection to download the club programs.

The club programs are stored locally to the user location in step 1058. For example, a mass storage device associated with a residential user or business user could store the club programs.

In step 1062, the user selects one of the club program for playback. The program can be selected from a menu or selected while watching a club program that is also being played in real time from the linear schedule. The set top box 120 retrieves the club program from the mass storage device when the club program is selected for playback. The mass storage device is located at the user location, but could be either outside the set top box 120 integral to the set top box 120.

Playback of the club program can be fully controlled by the user in step 1066. For example, the user can command the set top box 120 with the remote control to fast forward, rewind, pause the playback. Use of the club program could be limited in various ways during the month to comply with any contractual requirements of the copyright holder. Additionally, the set top box 120 would automatically erase the club program when a window defined for its use has expired (or some other condition has triggered) unless the copyright holder allows indefinite storage.

Figure 11A:
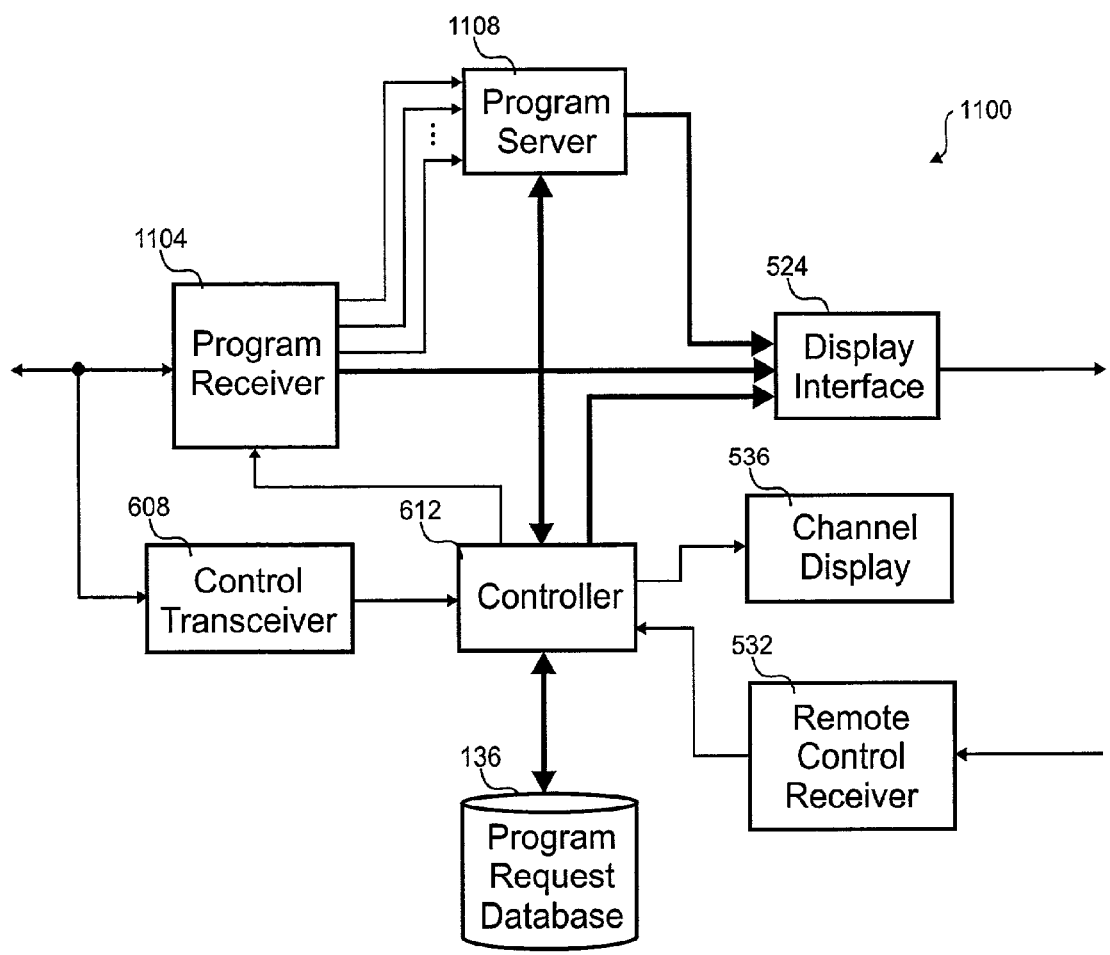
FIG. 11A is a block diagram depicting another embodiment of a set top box that records a number of programs simultaneously.

Referring next to FIG. 11A, an embodiment of a set top box 1100 is shown which records a number of programs simultaneously. A receiver 1104 produces multiple digital channels from a chosen carrier channel. The PIDs corresponding to digital channels are monitored in a plaintext MPEG signal in order to demultiplex the plurality of digital channels. These digital channels are coupled to a program server 1108 who stores some or all of the digital channels for later playback through the display interface 524. Typically, only a subset of the digital channels are appropriated by the program server 1108 for storage.

In other embodiments, the PIDs could be ignored and all the digital channels corresponding to a carrier channel are stored. If the user is watching a program, a single decryption engine 520 in the set top box 120 is needed to decrypt a statistically multiplexed and encrypted MPEG signal modulated on the carrier channel. Accordingly, the decryption engine 520 is not available to decrypt another carrier channel containing a digital channel meant for storage on the program server 1108. To avoid this resource conflict, a carrier channel, which contains the statistically multiplexed and encrypted MPEG signal along with the digital channel meant for storage, is written to the program server 1108 without processing. When later playback is desired, the statistically multiplexed and encrypted MPEG signal is read from the program server 1108, decrypted in the decryption engine 520, the desired digital channel is demultiplexed and the digital channel is decompressed. Finally, the decompressed digital signal is then formatted for display on the television.

If three or more tuners were available in another embodiment, a number of statistically multiplexed and encrypted MPEG signals could be recorded at one time. This embodiment avoids the need to decrypt several multiplexed signals at one time.

Figure 11B:
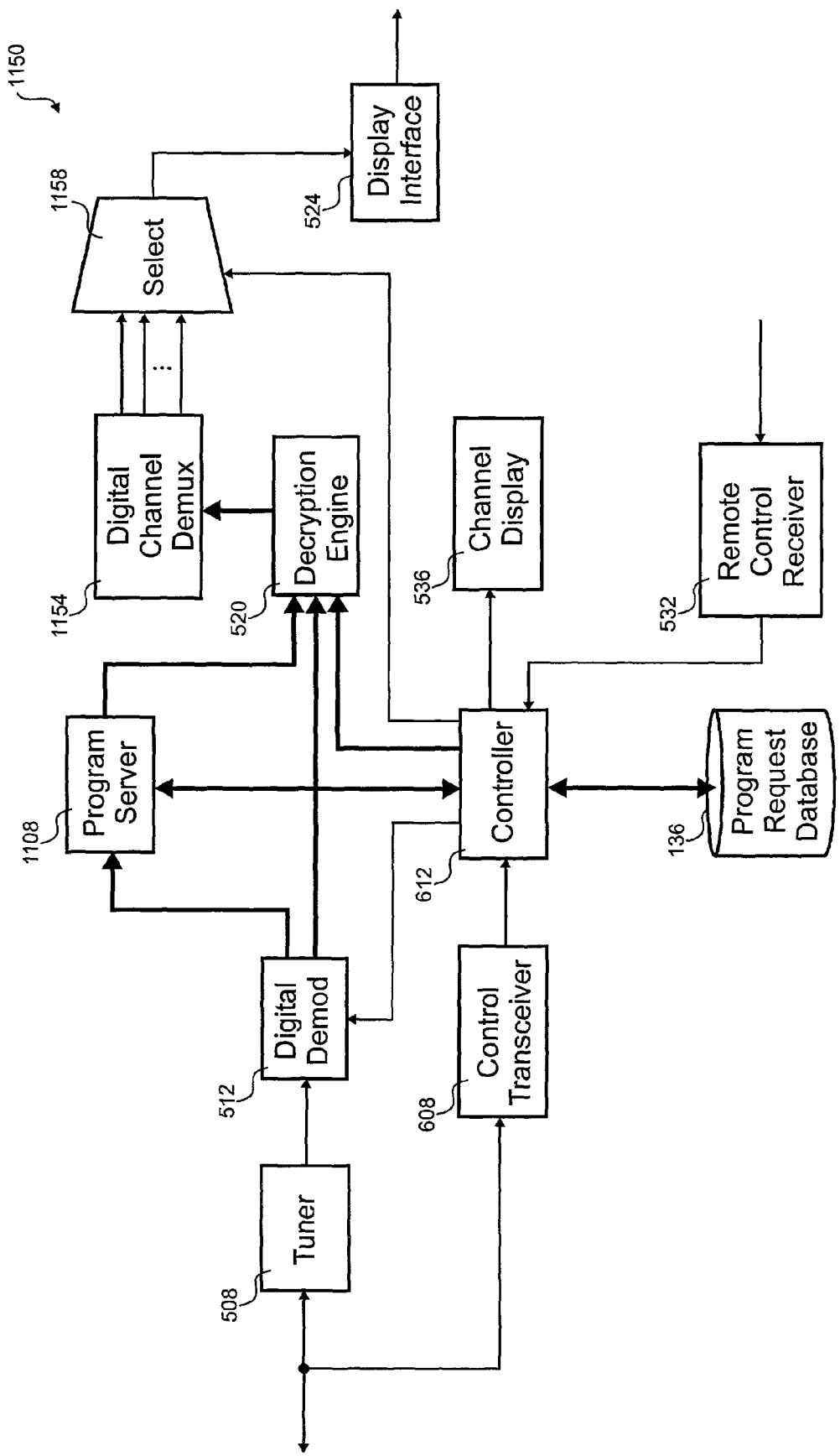
FIG. 11B is a block diagram depicting yet another embodiment of a set top box that records a whole multiplexed program stream at one time.

Referring next to FIG. 11B, a block diagram is shown that depicts yet another embodiment of a set top box 1150 that records a whole multiplexed program stream at one time. In this embodiment, the tuner 508 strips the analog carrier channel from the received frequency multiplexed signal. The digital demodulator 512 removes the multiplexed digital signal from the analog carrier and feeds the multiplexed signal to either the program server 1108 or the decryption engine 520.

Programs either bypass the program server 1108 for display without storage or are stored on the program server 1108 for later playback. The whole multiplexed program stream is recorded on the program server 1108. Regardless of whether the multiplexed program stream comes from the digital demodulator 512 or the program server, it is decrypted by the decryption engine 520. By monitoring PIDs, a digital channel demultiplexer 1154 divides out the programs from the multiplexed signal. A select circuit 1158 chooses the proper program to display to the user.

Figure 11C:
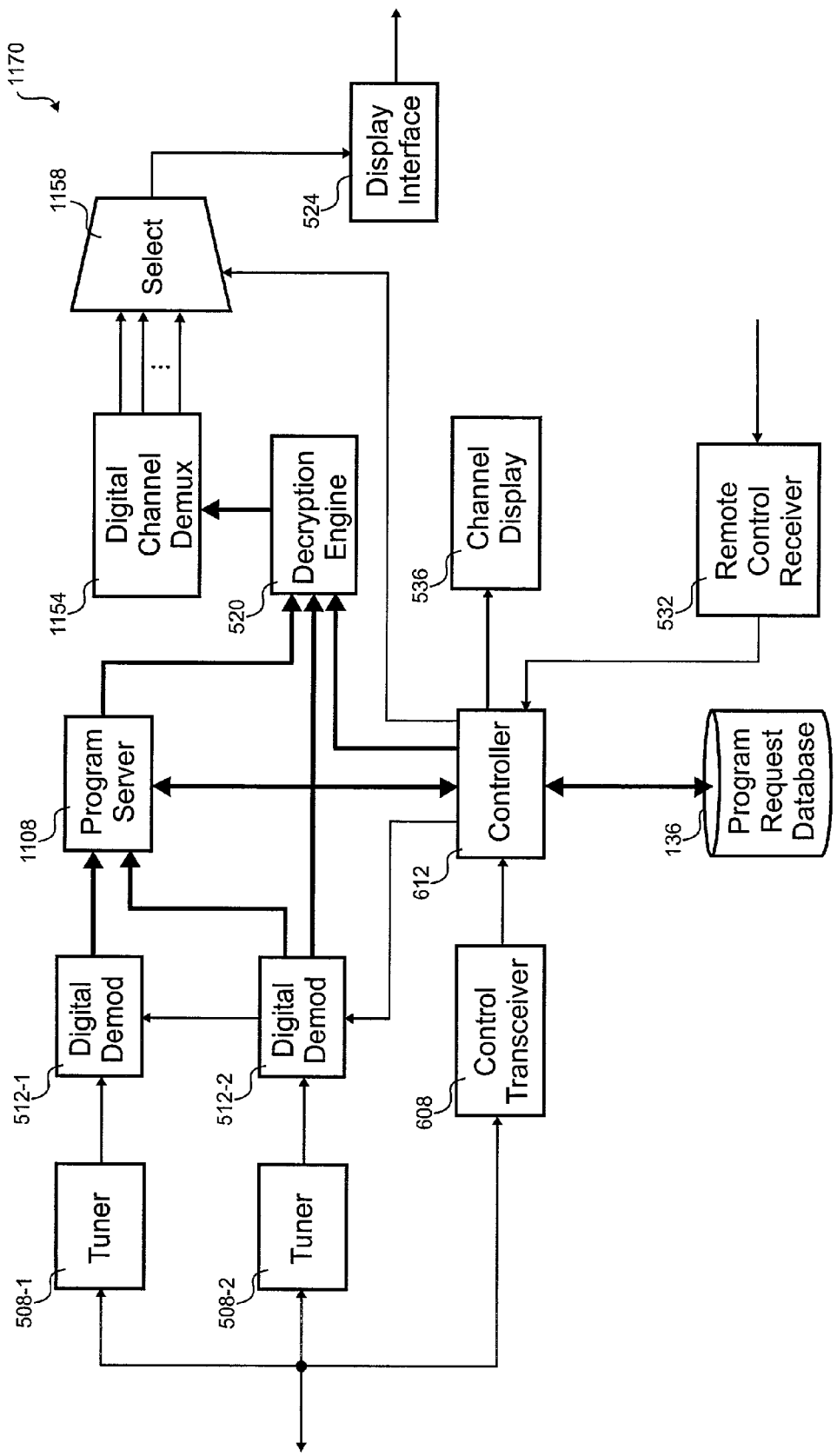
FIG. 11C is a block diagram depicting still another embodiment of a set top box that includes two tuners.

With reference to FIG. 11C, a block diagram is shown that depicts still another embodiment of a set top box 1170 that includes two tuners. The additional tuner 508-1 allows recording two multiplexed program streams at the same time or playing one program while recording another multiplexed program stream. Other embodiments, could use the second tuner to provide picture-in-a-picture capability.

Figure 12A:
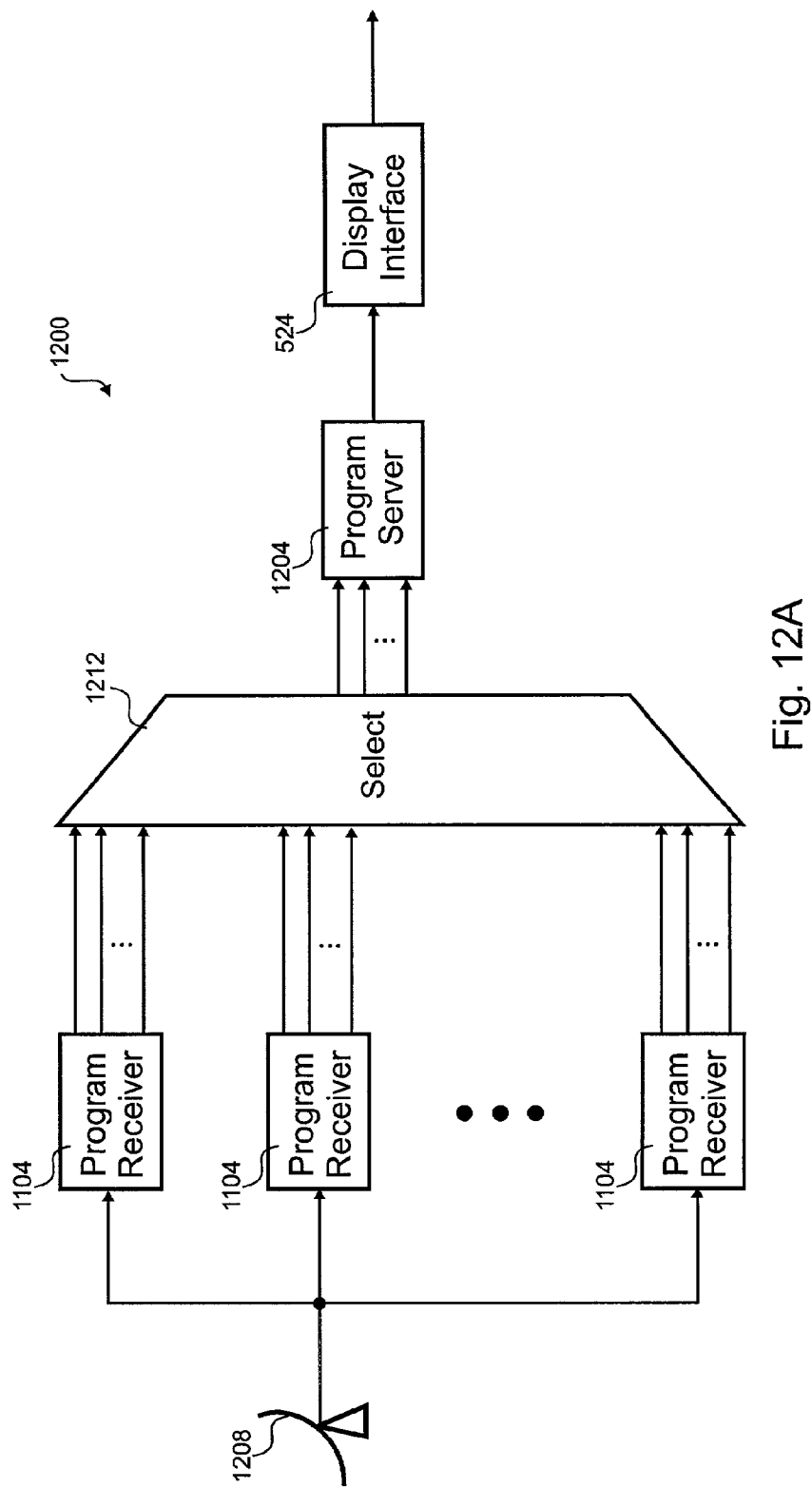
FIG. 12A is a block diagram showing yet another embodiment of a set top box that records programs on several different carrier channels.

With reference to FIG. 12A, a block diagram of another embodiment of a set top box is shown which records programs from several different carrier channels simultaneously. In this embodiment, a satellite dish 1208 receives a number of carrier channels that are combined through frequency division multiplexing. For example, a satellite that the dish 1208 receives the carrier channels from could have thirty transponders where each transponder corresponds to a carrier channel. Each transponder produces a data stream at a rate of twenty-seven megabits per second where each digital channel generally uses two and a half megabits per second. Accordingly, there are approximately ten digital channels on each carrier channel.

A number of program receivers 1104 each tune to a different carrier channel in order to produce a number of digital channels which correspond to their respective carrier channel. The digital channels from each program receiver 1104 are coupled to a select circuit 1212. The select circuit 1212 reduces the number of digital channels to an amount that can be stored by the program server 1204. Once screened down, the desired digital channels carrying their club programs are stored in the program server 1204. After storage, the club programs are sent one at a time to the display interface 524 for playing on a television or stereo.

Figure 12B:
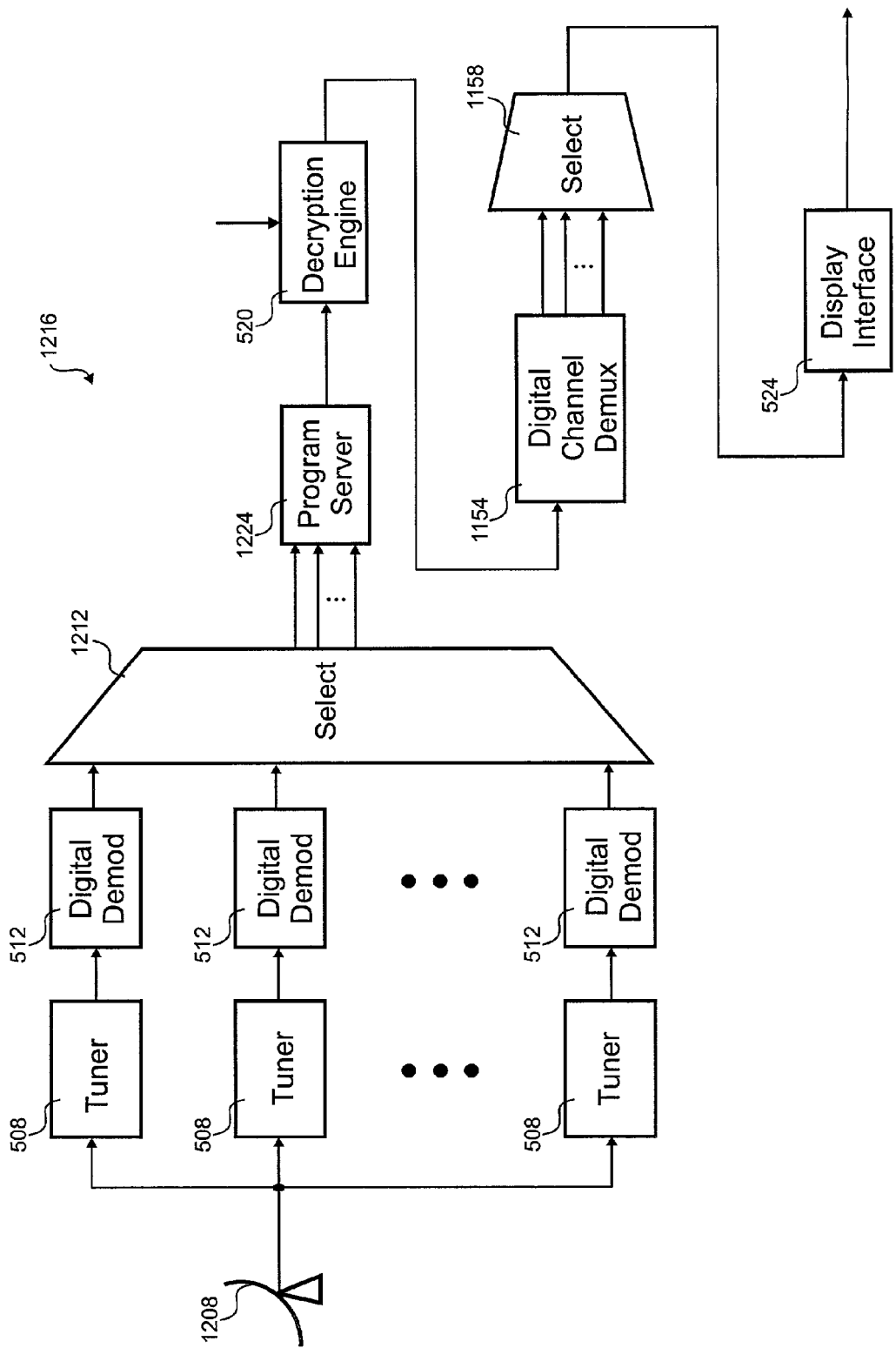
FIG. 12B is a block diagram showing still another embodiment of a set top box that records several different carrier channels in their entirety.

With reference to FIG. 12B, a block diagram showing still another embodiment of a set top box 1216 that records several different carrier channels in their entirety is shown. This embodiment tunes to a number of carrier channels with a number of tuners 508 and demodulates them in a digital demodulator 512. Each digital demodulator 512 produces a multi-channel program stream that includes one or more digital channels. The select circuit 1212 may reduce the number of multi-channel program streams. A program server 1224 stores the selected multi-channel program streams.

A multi-channel program stream can be retrieved from the program server. A decryption engine 520 decrypts the multi-channel program stream to produce a plain text equivalent. A digital channel demultiplexer 1154 divides out the digital channels from the plain text multi-channel program stream.

Another select circuit 1158 chooses the desired digital channel for conversion to an analog equivalent in the display interface 524.

Although this embodiment selects among a number of multi-channel program streams, some embodiments could only process a single multi-channel program stream. Other embodiments could have multiple decryption engines, digital channel demultiplexers and select circuits to provide a number of digital channels from the program server. Some embodiments could have the cable TV operator control the select circuit such that the stored multi-channel program streams are controlled remotely and not by the user.

Figure 13A:
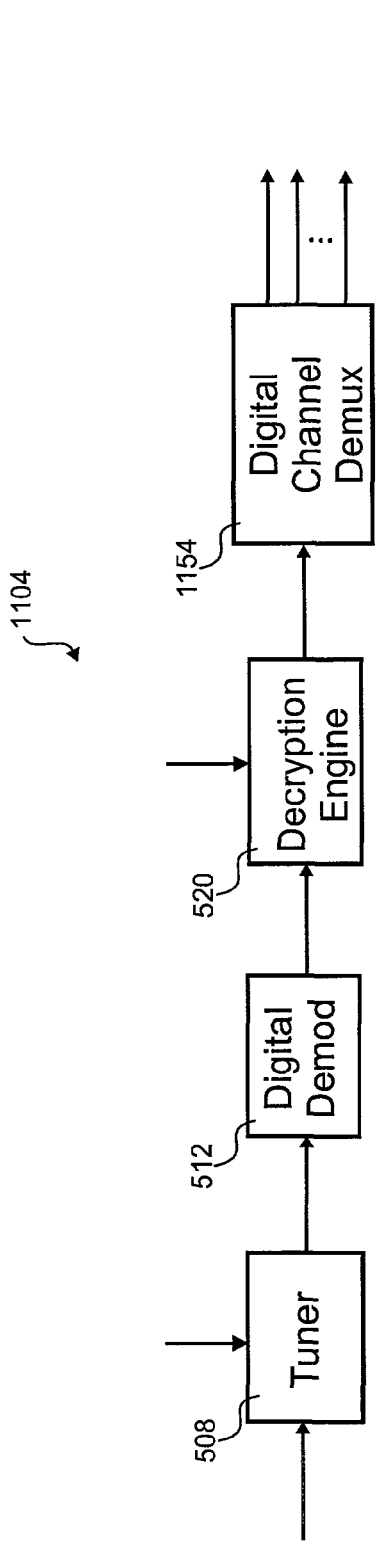
FIG. 13A is a block diagram illustrating an embodiment of a program receiver that produces multiple digital channels simultaneously.

Referring next to FIG. 13A, a block diagram illustrating an embodiment of a program receiver 1104 which produces multiple digital channels simultaneously is shown. The tuner 508 downconverts the desired carrier channel to an IF carrier from the multiple carrier channels frequency multiplexed together. The digital demodulator 512 converts the data signal riding upon the IF carrier to a digital baseband signal which is an encrypted MPEG signal. The decryption engine 520 performs decryption of the digital baseband signal in order to produce a plaintext MPEG signal. The digital channel demultiplexer 1154 monitors the headers and separates the digital channels in the plaintext MPEG signal based upon the PIDs. Each signal from the digital channel demultiplexer 1154 corresponds to a different digital channel.

Figure 13B:
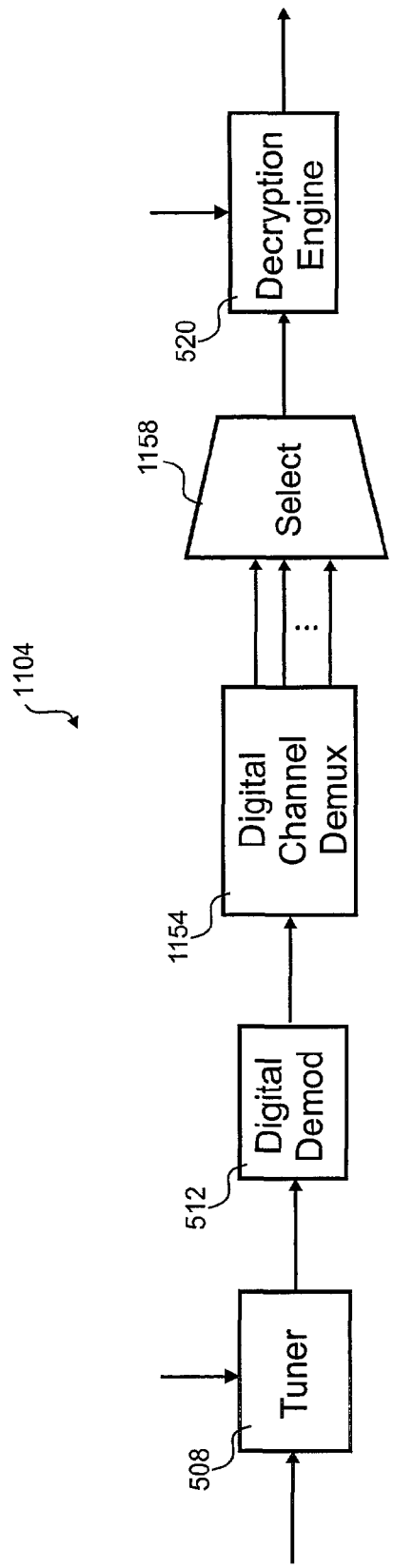
FIG. 13B is a block diagram illustrating another embodiment of a program receiver that also produces multiple digital channels simultaneously.

With reference to FIG. 13B, a block diagram illustrating another embodiment of a program receiver 1104 is shown. In this embodiment, a digital channel is decrypted in the decryption engine 520 after selection by the select circuit 1158. In contrast, the whole multi-channel program stream is decrypted in the embodiment of FIG. 13A. It is to be understood that decryption could be performed on the multi-channel program stream and/or the digital channels contained therein in various embodiments.

Figure 14:
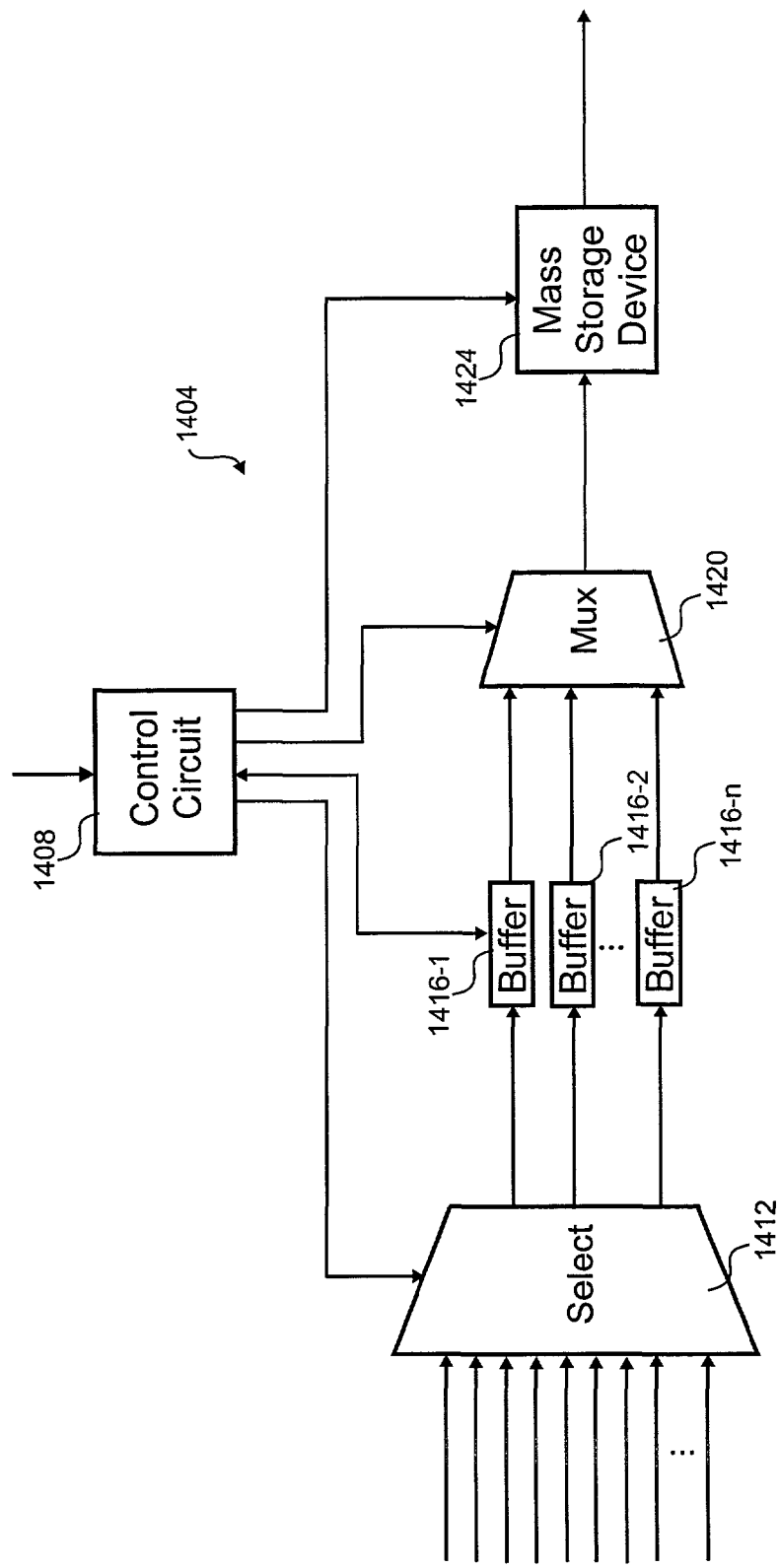
FIG. 14 is a block diagram showing an embodiment of a program server that uses buffers to store multiple digital channels simultaneously.

Referring next to FIG. 14, a block diagram of an embodiment of a program server 1404 is shown which uses buffers 1416 in order to simultaneously store multiple digital channels. The program server 1404 includes a control circuit 1408, a select circuit 1412, digital channel buffers 1416, a multiplexer 1420, and a mass storage device 1424.

The control circuit 1408 receives information from the controller 612 in order to control operation of the select circuit 1412, buffers 1416, multiplexer 1420 and mass storage device 1424. The control circuit 1408 selects the appropriate digital channels 1412, manages the buffers 1416, multiplexes the outputs from the buffers 1416, and manages operation of the mass storage device 1424. Various state machines and/or microprocessors may be used to implement the functionality of the control circuit 1408.

The select circuit 1412 reduces the number of digital channels received to an amount of digital channels which is stored in the program server 1404. Only a subset of the digital channels are generally used to transmit club programs. In this embodiment, the select circuit 1412 chooses four of the digital channels for archiving in the storage device 1424.

A number of buffers 1416, one for each stored digital channel, store the desired digital channels. Each buffer 1416 receives its selected digital channel in serial fashion and stores the program stream until the mass storage device 1424 is ready to receive the program stream. The buffers 1416 are FIFO buffers that have various flags to control underflow and overflow. The flags are provided to the control circuit 1408 in order to signal possible overflow and under flow situations.

The multiplexer 1420 routes data from the buffers 1416 to the mass storage device 1424. All the buffer outputs are accepted by the multiplexer 1420, but only one of these is provided to the mass storage device 1424 at a time. By sequentially connecting each buffer 1416 to the mass storage device 1424 the buffers 1416 are drained before they overflow. The multiplexer 1420 drains the buffers 1416 according to a predetermined algorithm such as draining the fullest buffer 1416 first.

The digital channels are stored in the mass storage device 1424. The mass storage device 1424 only has a limited amount of storage bandwidth, meaning only a certain amount of data can be streamed to the storage device 1424 over time. If the storage device 1424 is not quick enough, the digital channels will provide too much data which will overflow the buffers 1416. Various embodiments of the mass storage device 1424 could include one or more hard drives, tape drives, optical drives or other storage devices. Having multiple hard drives, for example, would allow greater storage bandwidth because incoming data could be divided amongst the drives.

Figure 15:
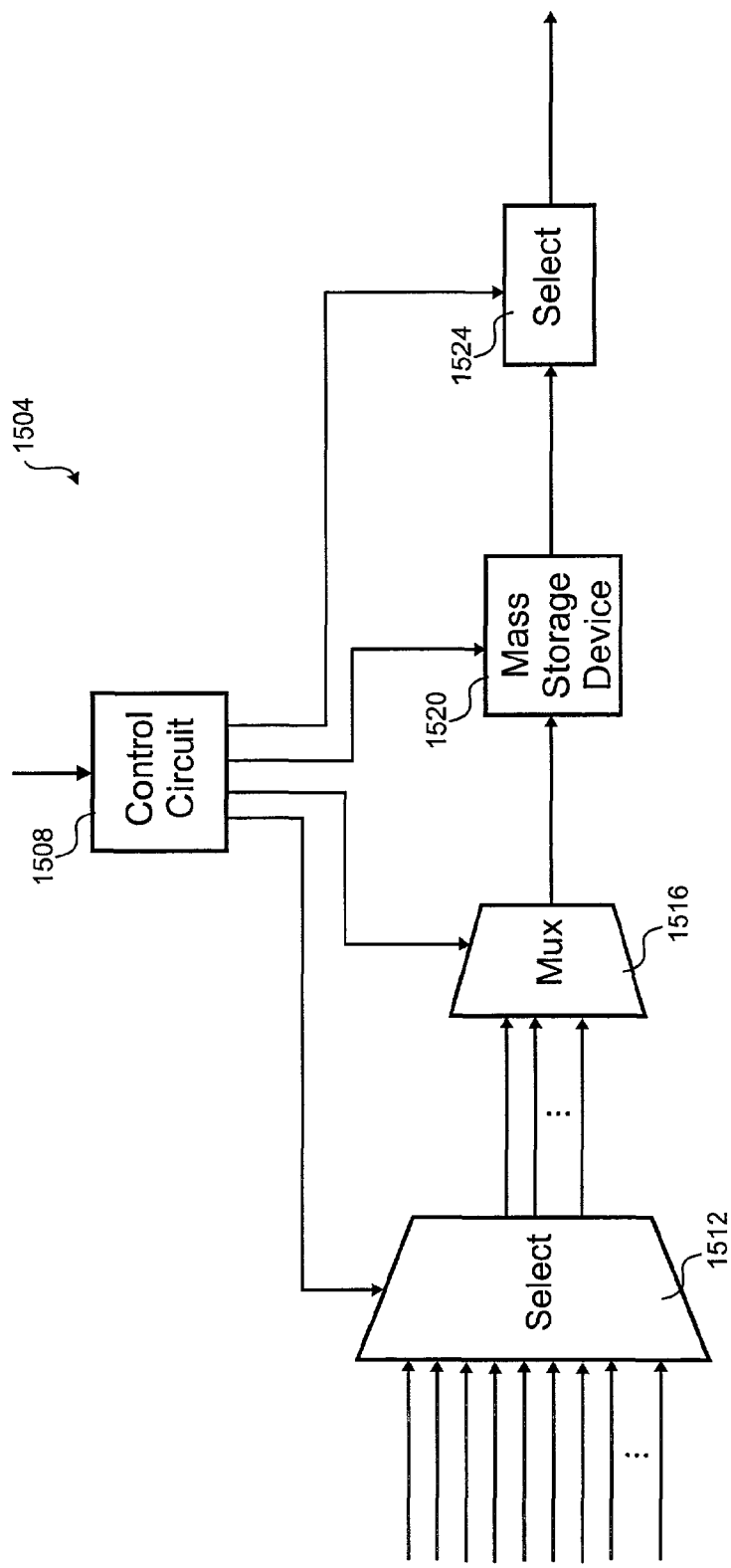
FIG. 15 is a block diagram illustrating another embodiment of a program server that uses statistical multiplexing to combine a number of digital channels.

With reference to FIG. 15, a block diagram of another embodiment of a program server 1504 is depicted which uses statistical multiplexing to combine a number of digital channels into a single data stream stored on a mass storage device 1520. The control circuit provides control signals that select the digital channels, multiplex them together, store them, retrieve them, and select the desired digital channel for viewing.

A select circuit 1512 accepts a number of digital channels and reduces that number. The reduced number are statistically multiplexed together using PIDs in headers to distinguish the separate digital channels before combining them in a statistically multiplexed data stream. The mass storage device 1520 stores the statistically multiplexed data stream. During playback, the previously stored statistically multiplexed data stream is fed to a select circuit 1524 that removes the desired digital channel from the data stream.

Figure 16:
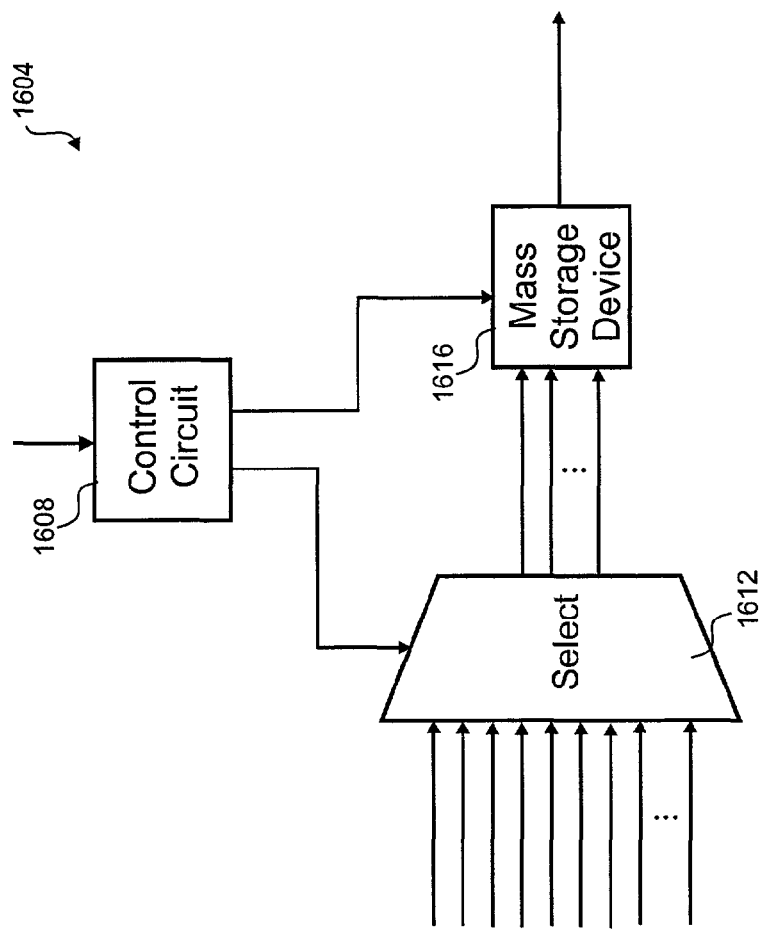
FIG. 16 is a block diagram showing yet another embodiment of a program server that uses a mass storage device that can store multiple digital channels at one time.

Referring next to FIG. 16, a block diagram shows yet another embodiment of a program server 1604 that uses a mass storage device 1616 that can store multiple digital channels at one time. A select circuit 1612 reduces the number of digital channels. The reduced number of digital channels are separately coupled to the mass storage device 1616 and subsequently stored. The control circuit 1608 manages the operation of these functions.

The mass storage device 1616 of this embodiment accepts multiple digital channels at one time and stores them. Either a single disk drive or multiple disk drives in the storage device 1616 are used for storing the digital channels. In the case of a single drive, there could be multiple platters and corresponding write heads. Each write head could write a different digital channel on its respective surface of the platter. Alternatively, a different drive could store each digital channel if an array of drives were used.

The program servers of FIGS. 14-16 could be located in various places. For example, the program server could be proximate to the content provider. Alternatively, the program server could be in a node that services many different user locations.

Recording multiple channels allows storage of many programs at one time. Using this feature, club members could download their club programs more quickly. Additionally, off-peak times such at the middle of the night could be used to download these programs. Using bandwidth to distribute club programs at off-peak times reduces the cost of distribution.

FIGS. 17-22 describe processes for taking NVOD programming to provide VOD-like playback. Just like with VOD, the user can pause, fast-forward and rewind through these programs to the extent that the program is stored.

Although these embodiments refer to storing programs local to the user location, other embodiments could store programs remote to the user location and use a private channel to the user location.

Figure 17:
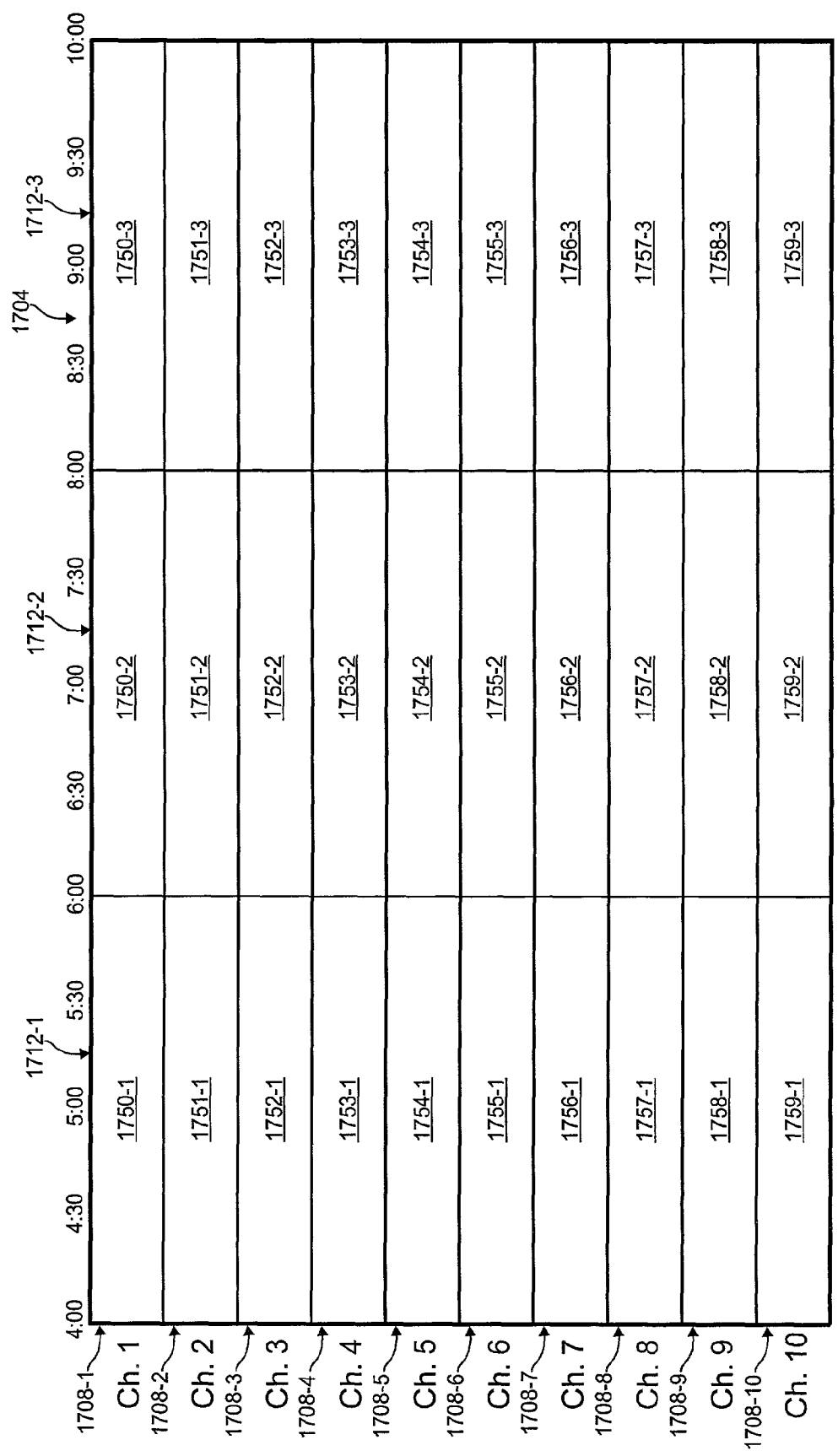
FIG. 17 is a block diagram of an embodiment of a multiplex of NVOD programs playing over a six hour period on a particular transponder.

Referring first to FIG. 17, a block diagram of an embodiment of a multiplex 1704 of NVOD programs 1750-1759 playing over a six hour period on a particular transponder 1704 is shown. On each digital channel 1708, a program 1750-1759 is played every two hours in an NVOD cycle 1712. The digital channels 1708 are multiplexed together in one data stream and are transported by the same transponder or analog carrier channel. The digital channels 1708 are segregated in the datastream with PIDs. The NVOD cycle 1712 of programs repeats every two hours in this embodiment, but other embodiments could use different cycle periods. The program 1750 on channel 1 1708-1, for example, could change every NVOD cycle 1712 or change less frequently. As will become clearer in the discussion of the next figure, program start times are offset on other transponders by a stagger period. Although this embodiment has ten digital channels 1708 for a transponder or analog carrier channel, other embodiments could have more or less digital channels 1708.

Figure 18:
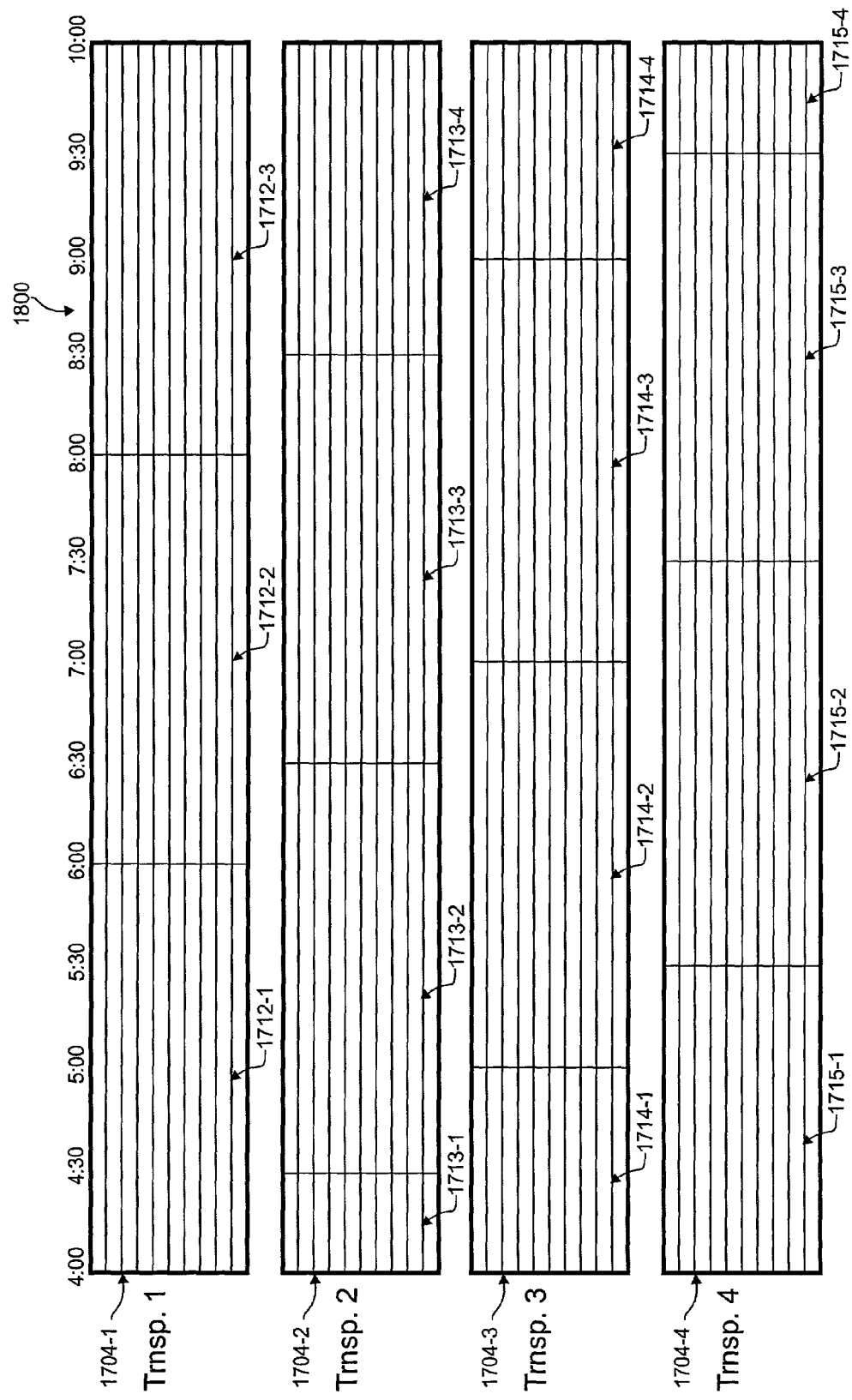
FIG. 18 is a block diagram of an embodiment of four multiplexes of NVOD programs where each transponder has start times staggered from the other transponders.

Referring next to FIG. 18, a block diagram of an embodiment of four multiplexes 1800 of NVOD programs where each transponder 1704 has start times staggered from the other transponders 1704 is shown. This embodiment uses four transponders 1704 to send program cycles that are offset by a stagger period of thirty minutes for a two hour program. Although this embodiment uses the term "transponders", the number of channels 1708 could be transported by any method where they are grouped together, for example, a datastream carried on an analog carrier channel.

In this embodiment, ten channels are sent by each transponder 1704 where each channel 1708 shows a two-hour program 1750-1759. The start times for a cycle of NVOD programs 1750-1759 are staggered by a half-hour between each transponder 1704. For example, on a first channel 1708-1 for the first transponder 1704-1, the movie "Fletch" could be shown at 4:00. A half-hour later, Fletch may also be shown on a first channel 1708-1 for the second transponder 1704-2 at 4:30. Fletch also starts on the third transponder 1704-3 at 5:00 and the fourth transponder 1704-4 at 5:30.

In this embodiment, the stagger period is chosen based upon the length of the program 1750-1759 and the number of channels 1708 used for the program 1750-1759. The length of the program 1750-1759 can be divided by the number of channels 1708 showing that program 1750-1759 to get the stagger period.

Figure 19A:
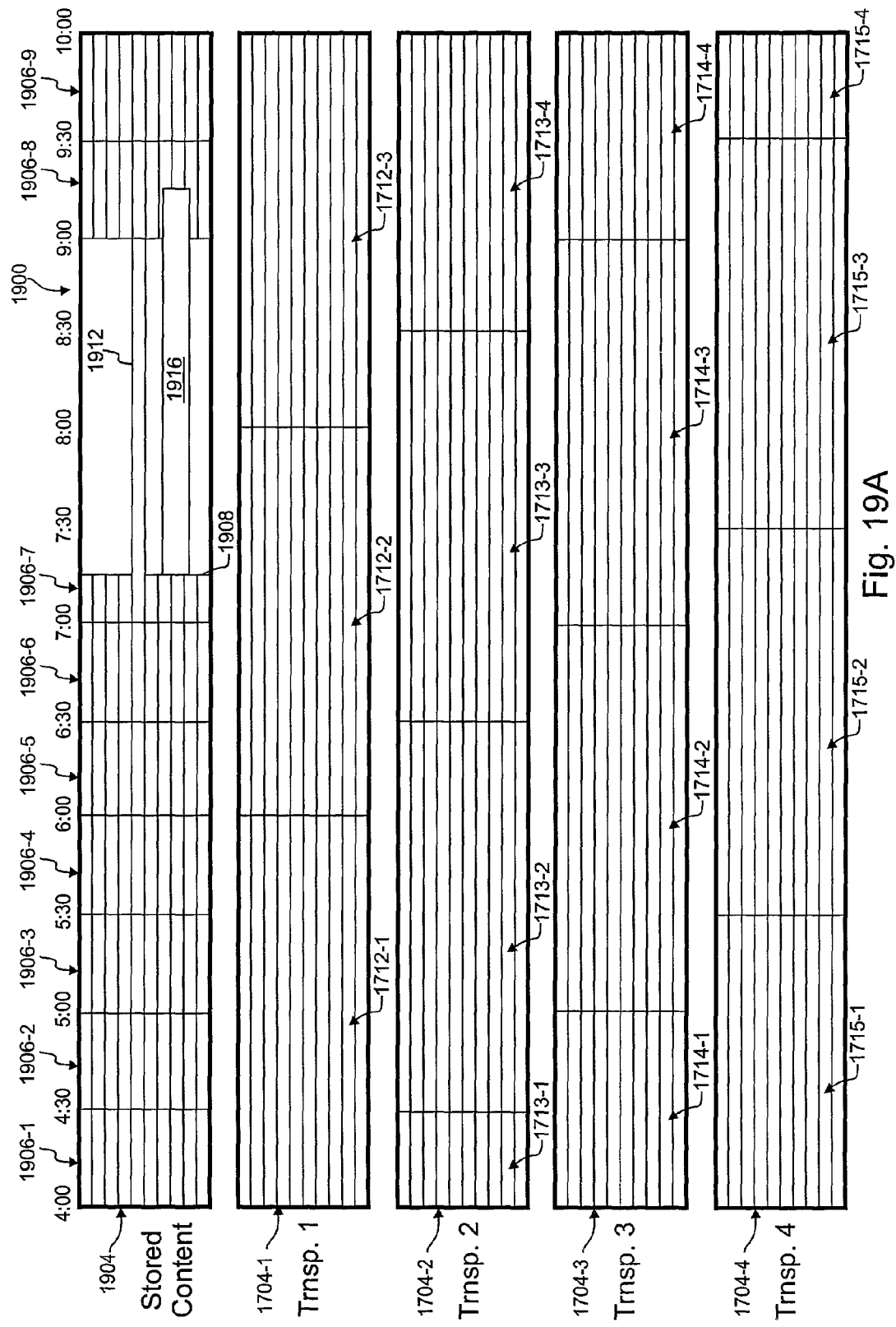
FIG. 19A is a block diagram of an embodiment of four multiplexes of NVOD programs along with stored content activity.

With reference to FIG. 19A, a block diagram of an embodiment 1900 of four multiplexes 1704 of NVOD programs and along with stored content activity 1904 is shown. In the stored content activity portion 1904, thin bars represent storing a program and thick bars represent retrieving a program for playback. For example, digital channel five 1708-5 from transponder three 1704-3 in the third NVOD cycle 1714-3 is stored as the thin bar 1912. That same program is retrieved as the thick bar 1916.

In this embodiment, each new NVOD cycle 1712-1715 is recorded until the next NVOD cycle 1712-1715 begins. For example, between 5:00 and 5:30 a tuner is directed to the third transponder 1704-3 to record all ten channels 1708 to store a first portion of each program 1750-1759. Storage of a multiplex of programs is called a storage cycle 1906-3. At 5:30, the tuner is directed to the fourth transponder 1704-4 to record a new storage cycle 1906-4. The programs for each NVOD cycle 1712-1715 may be the same or have differences between each NVOD cycle 1712-1715. In this embodiment, one storage cycle 1906 overwrites the previous storage cycle 1906.

Approximately fifteen minutes into the seventh storage cycle 1906-7, at a selection point labeled 1908, the user chooses digital channel five 1708-5 for playback. The user in this embodiment is given a menu of NVOD program that can be manipulated like VOD programs. For example, the user selected the movie "Fletch" which corresponds to digital channel five 1708-5 from transponder three 1704-3 in the third NVOD cycle 1714-3.

At the selection point 1908, changes in the normal storage cycle 1906 happen. Only the selected channel 1708-5 from transponder three 1704-3 is recorded after the selection point 1908 as denoted by the thin bar 1912. The other digital channels 1708 in the third NVOD cycle 1714-3 are removed from the multiplexed data stream before storage.

In parallel to the recordation of the program 1754, playback begins after the selection point 1908 as denoted by the thick bar 1916. In the depicted embodiment, the playback takes approximately two hours, but that could be longer or shorter depending upon the length of the program 1750-1759 and the amount of pausing, fast-forwarding and/or rewinding done during playback. The next normal storage cycle 1906-8 begins at 9:00 after the fourth NVOD cycle 1715-4 of the fourth transponder 1704-4 is done recording at 9:00. Playback continues until 9:15 and partially overlaps the next storage cycle 1906-8.

This embodiment uses a single tuner to record the first portion of new NVOD cycles 1712-1715. But, when recording a whole program 1912, the recordation of the first portion is interrupted. Other embodiments could continue to record the first portion of NVOD cycles 1712-1715 even while recording a whole program 1912 using a second tuner. Embodiments with two or more tuners could record first portions that are larger than the stagger period. For example, the above embodiment could record one hour of each NVOD cycle 1712-1715 with two tuners.

Figure 19B:
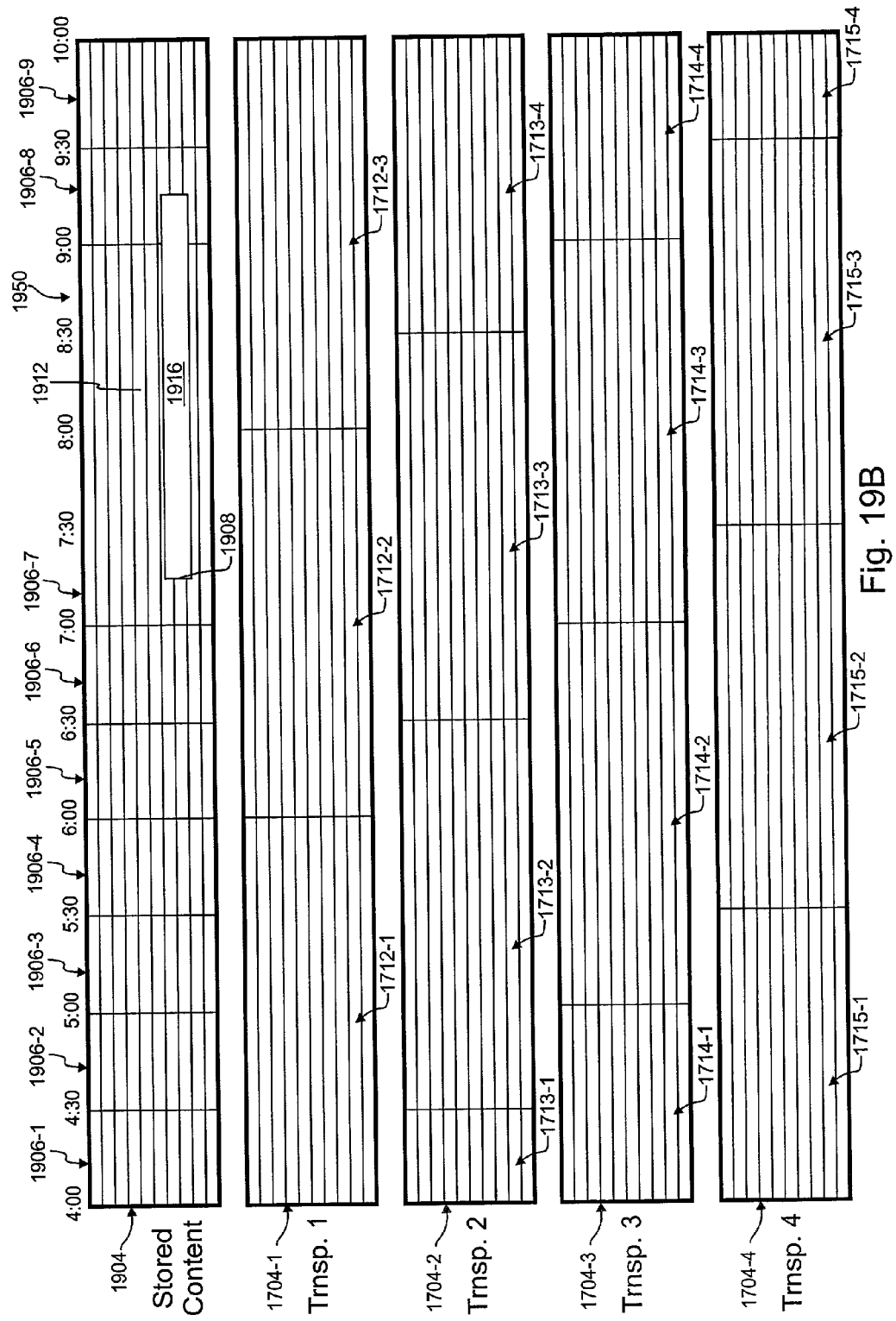
FIG. 19B is a block diagram of another embodiment of four multiplexes of NVOD programs along with stored content activity.

Referring next to FIG. 19B, a block diagram of another embodiment 1950 of four multiplexes 1704 of NVOD programs 1750-1759 along with stored content activity is shown. This embodiment records the whole multiplexed program stream in the seventh storage cycle 1906-7 even though only one program 1912 may ever be watched. The multiplexed program stream may be stored in encrypted or unencrypted form. After viewing, the extra programs may be deleted to make room on the program server 1108.

Figure 20A:
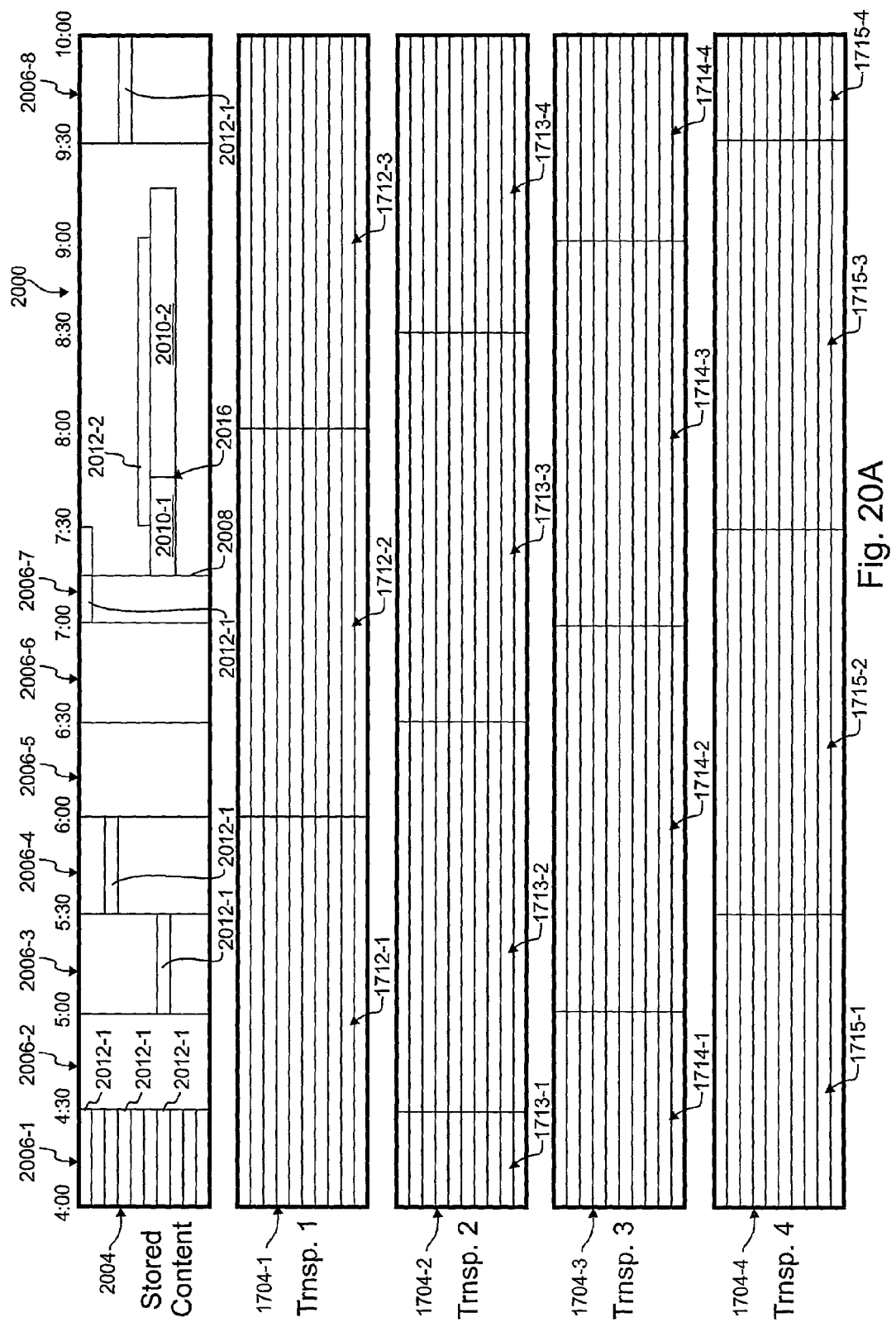
FIG. 20A is a block diagram of yet another embodiment of four multiplexes of NVOD programs along with stored content activity.

Referring next to FIG. 20A, a block diagram of another embodiment of four multiplexes 1704 of NVOD programs 1750-1759 along with stored content activity 2004 is shown. In this embodiment, the first portion 2012-1 of a NVOD program is stored for a period of time. If the user selects to view the program in VOD-like mode, the remaining portion(s) are recorded from NVOD channels 1708 of transponders 1704 that are playing the remaining portion(s). As with the previous figure, storage activity 2004 is denoted in thin bars 2012 for writes and thick bars 2010 for reads from the storage medium. The storage medium could be at the user location or remote to the user location.

The depicted storage activity 2004 begins at a 4:00 storage cycle 2006-1 where the first portion 2012-1 of the programs 1750-1759 on the first transponder's 1704-1 first NVOD cycle 1712-1 are stored for a period equal to the stagger period or one half-hour in this embodiment. In the following storage cycle 2006-2, no programs are stored because a determination is made that the currently stored first portions are already stored. Only first portions 2012-1 for programs 1750-

1759 that are not already stored are recorded in any storage cycle 2006. In the third storage cycle 2006-3, a determination is made that the seventh channel 1708-7 of the third transponder 1704-3 has a new program 1756 whereafter a first portion of that program 1756 is stored. Once a program 1750-1759 is removed from the next NVOD cycle 1712, 1715, any stored first portion is marked for deletion if the storage space is needed by other programs.

In the seventh storage cycle 2006-7, it is determined that the program 1750 on the first channel 1708-1 of the third transponder 1704-3 is new. That program 1750 is stored. At a selection point 2008 around 7:15, the user selects one of the previously stored first portions 2012-1 for viewing in VOD-like mode. It is noted that only those programs 1750-1759 that have the remaining portion 2012-2 available for download are presented to the user for selection. The remaining portion 2012-2 begins recording at 7:30 from the third cycle 1714-3 of the third transponder 1704-3.

Playback of the recorded program 2016 begins right after the selection point 2008. Between 15-30 minutes of program is buffered in this example such that the user can fast-forward that same amount through the program 2016. Pausing the program 2016, however, would grow the buffered amount. There is no limit on the ability to pause or rewind the program 2016. The first portion 2010-1 and remaining portion 2010-2 are seamlessly spliced together to reformulate the program 2016.

This embodiment uses a single tuner for recording the first portion 2010-1 and remaining portion 2010-2. Other embodiments could use multiple tuners to record larger first portions and to download the remaining portion more quickly. For example, if there were three tuners, the remaining portion could retrieved by getting three half-hour segments from three transponders 1704 in parallel.

Figure 20B:
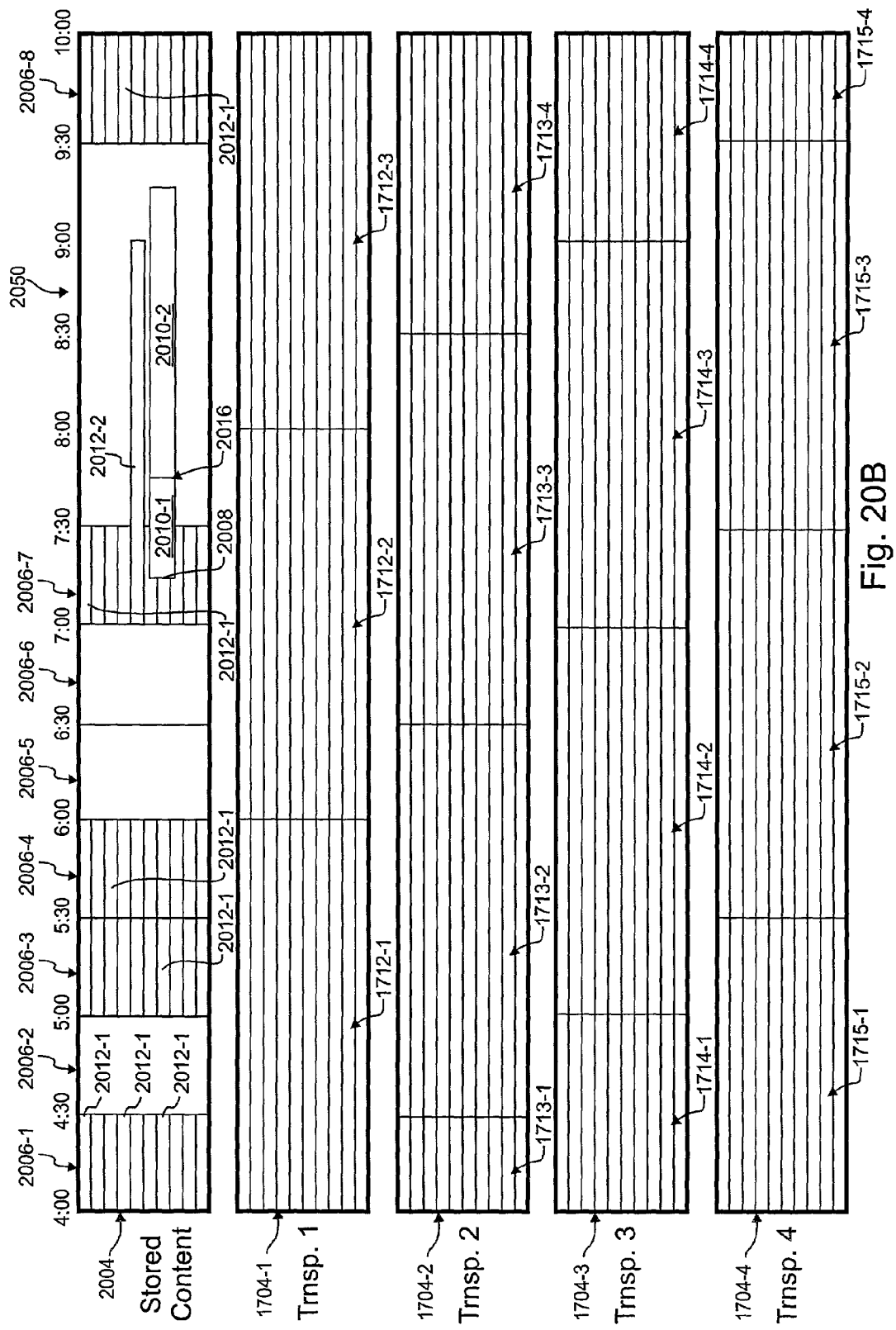
FIG. 20B is a block diagram of still another embodiment of four multiplexes of NVOD programs along with stored content activity.

Referring next to FIG. 20B, a block diagram of still another embodiment 2050 of four multiplexes 1704 of NVOD programs 1750-1759 along with stored content activity. This embodiment 2050 stores the all the NVOD cycles 1712-1215 when any of the channels 1708 carry a new program 1750-1759. In the depicted example, a new program 1750-1759 is detected such that the whole NVOD cycle 1712-1715 is recorded in the first, third, fourth, seventh, and eighth storage cycles 2006-1, 2006-3, 2006-4, 2006-7, 2006-8.

Figure 20C:
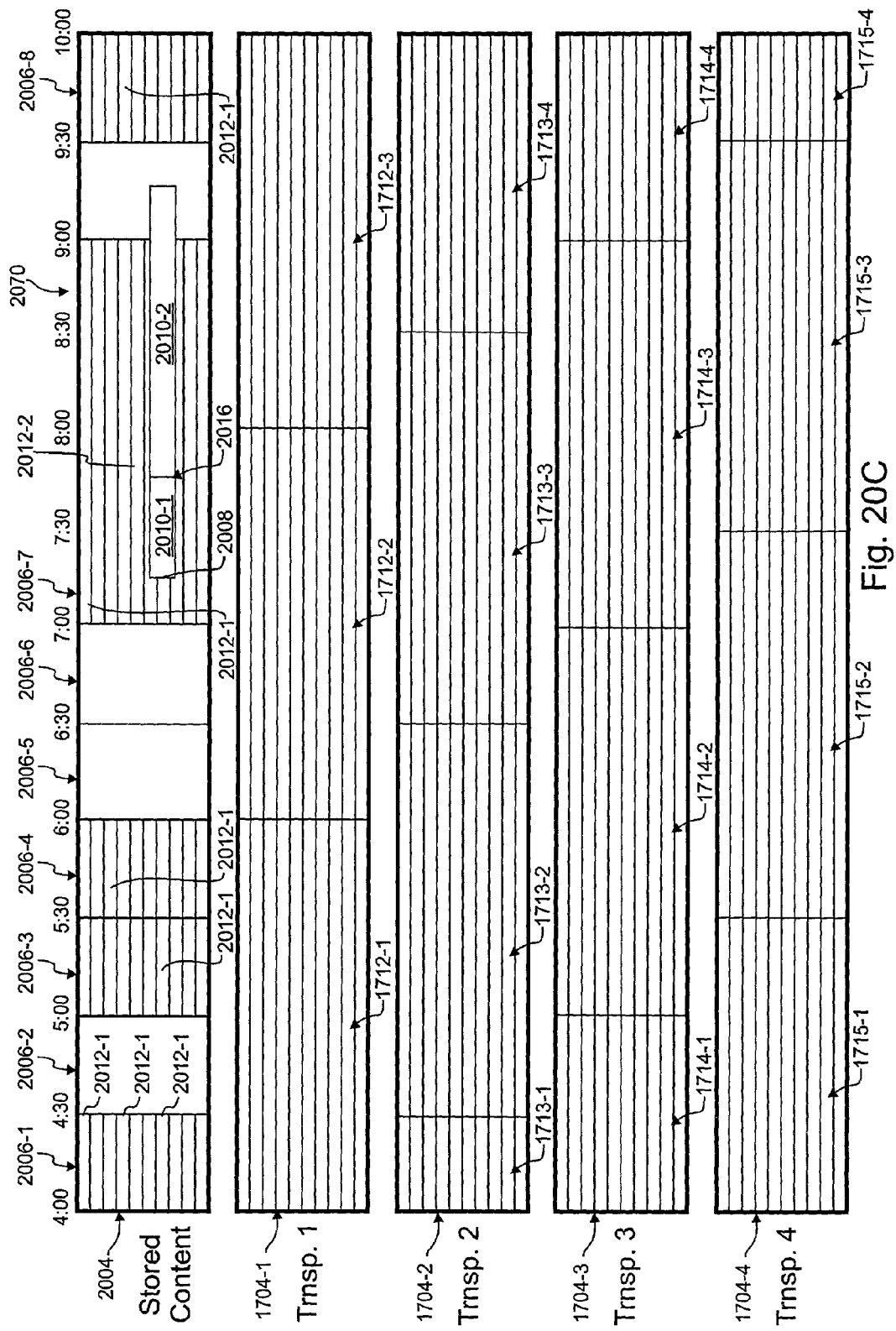
FIG. 20C is a block diagram of another embodiment of four multiplexes of NVOD programs along with stored content activity.

With reference to FIG. 20C, a block diagram of another embodiment 2070 of four multiplexes 1704 of NVOD programs 1750-1759 along with stored content activity. This embodiment 2070 continues recording all programs 1750-1759 when one program is chosen during a storage cycle 2006-7 that is recording a NVOD cycle 1712-1215.

Figure 21:
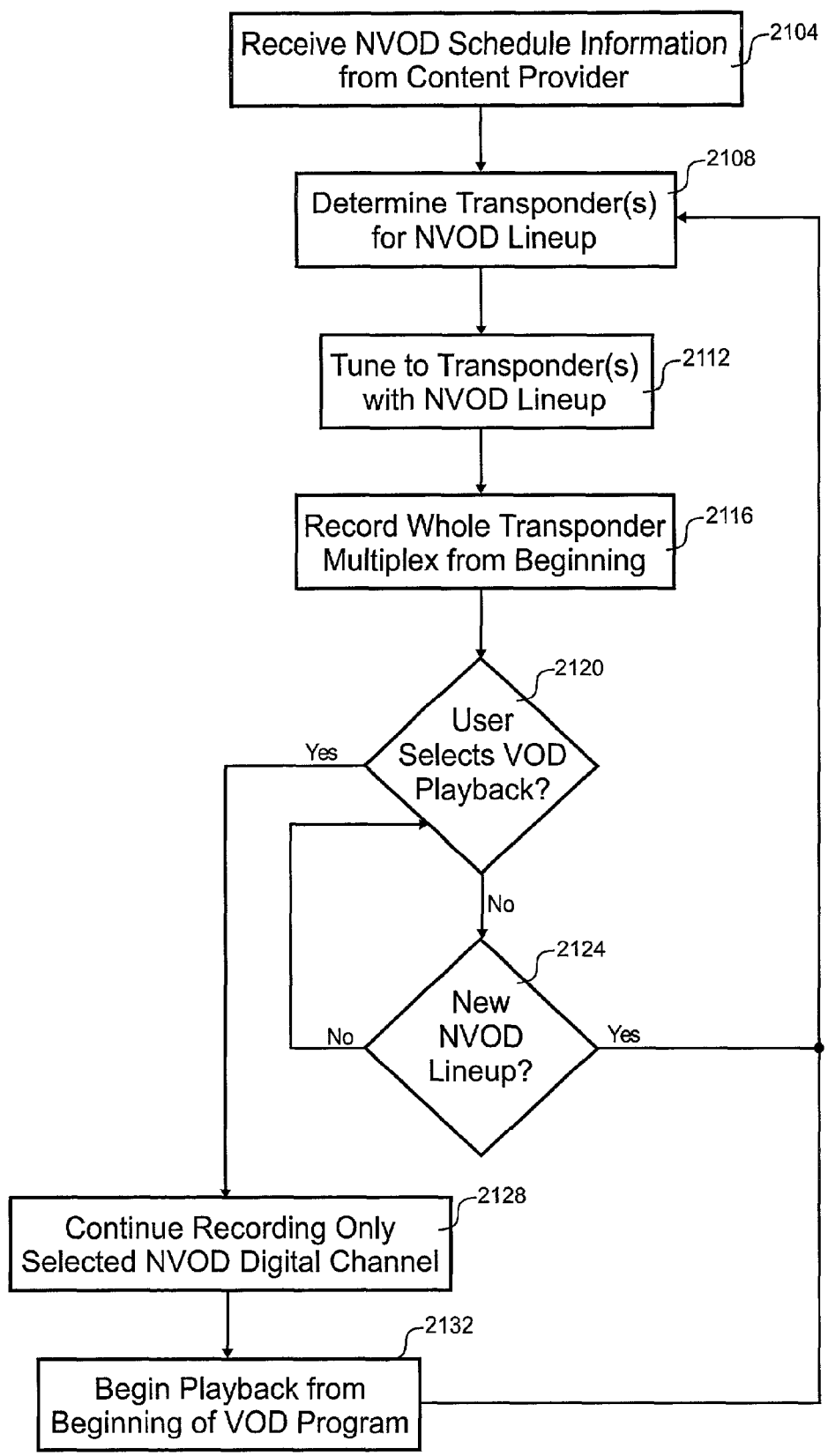
FIG. 21 is a flow diagram of an embodiment of a process for using a NVOD cycle of programs to provide a video on demand-like (VOD-like) service.

With reference to FIG. 21, a flow diagram of an embodiment of a process for using a NVOD cycle 1712-1715 of programs to provide VOD-like service is shown. The depicted portion of the process picks-up in step 2104 where the set top box 120 receives the linear program schedule from the content provider. Within the linear program schedule, the NVOD listings along with their corresponding channels 1708 and transponders 1704 are given. From the linear program schedule, the transponders 1704 used for the next few NVOD cycles 1712-1715 are determined in step 2108. The linear program schedule may have listings for the next few weeks, but only the next few NVOD cycles 1712-1715 are analyzed in this embodiment.

In step 2112, the transponder 1704 with the next NVOD cycle 1712-1217 is tuned to. The whole multiplexed program stream from the transponder 1704 is recorded from the beginning in step 2116. In some embodiments, the whole multiplexed program stream is stored without decryption. In other embodiments, the multiplexed program stream is decrypted before storage.

In step 2120, a determination is made as to whether the user has selected VOD-like playback for the NVOD program 1750-1759. The user could select VOD-like playback from a menu or by attempting to manipulate playback. A payment screen might be presented if the user were not already a club member. If no program is selected during the storage cycle 1906, a further test in step 2124 determines if another NVOD cycle 1712-1217 is beginning. These NVOD cycles 1712-1217 are generally separated by the stagger period. When a new cycle 1712-1217 is detected, processing loops back to step 2108 where the next cycle 1712-1217 is recorded. If no new cycle 1712-1217 is detected, processing doubles-back to step 2120 where the test for the user selecting VOD-like playback is performed again.

If the user selects VOD-like playback in step 2120, processing proceeds to step 2128 where the set top box 120 will continue recording the program 1912 past the stagger period and until the whole program 1912 is stored. As the program 1912 is being recorded, playback can begin in VOD-like fashion. The user typically starts from the beginning of the stored program 1916 for playback, but the user could pause, rewind or fast forward to the extent that the program 1916 is stored.

Figure 22:
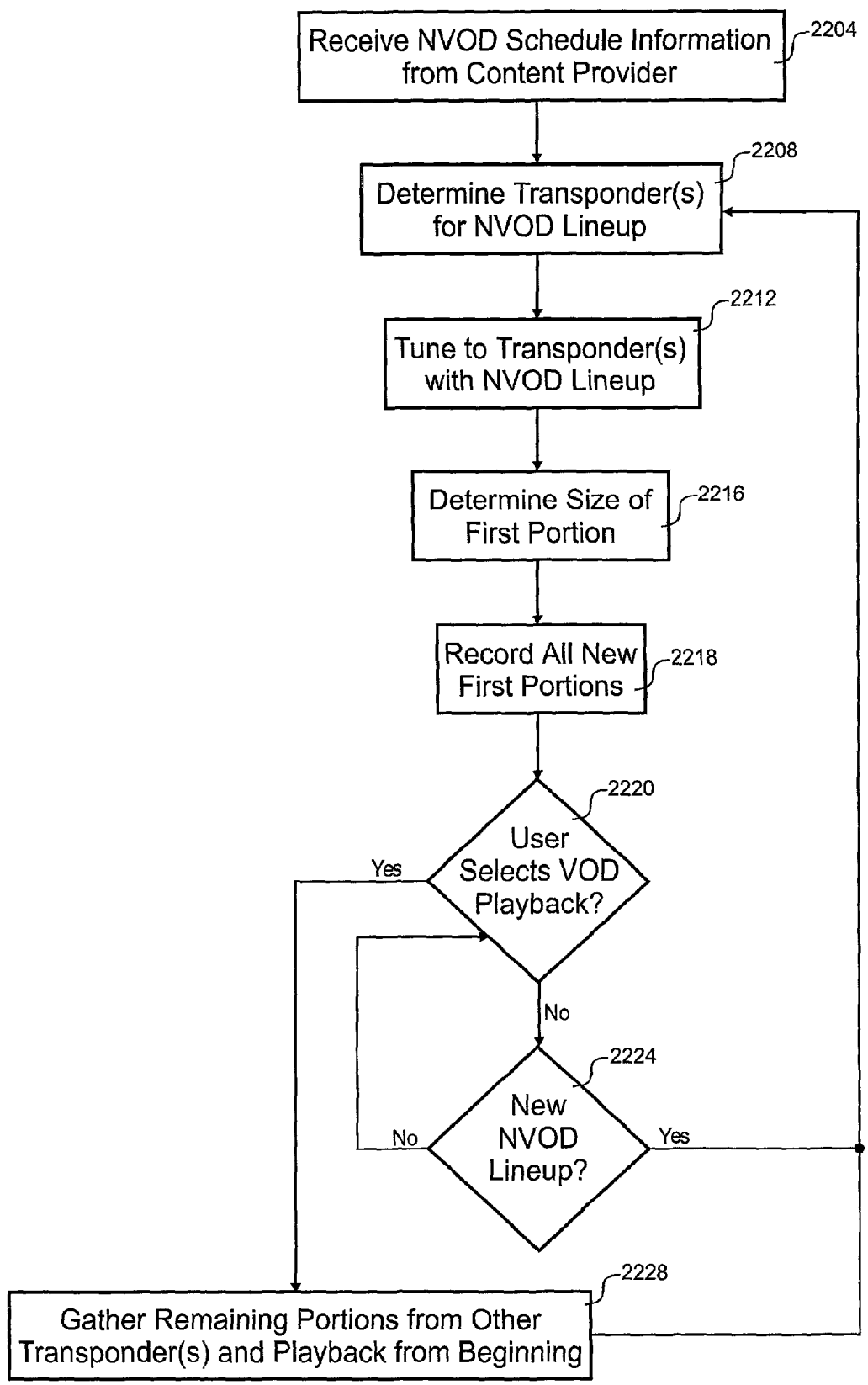
FIG. 22 is a flow diagram of another embodiment of a process for using the NVOD cycle of programs to provide VOD-like service.

Referring next to FIG. 22, a flow diagram of another embodiment of a process for using the NVOD cycle of programs to provide VOD-like service is shown. The depicted portion of the process begins in step 2204 where a linear program schedule with NVOD cycle information is received from the content provider. The transponder 1704 with the next NVOD cycle 1712-1215 is determined in step 2208.

The tuner is adjusted to receive the multiplexed data stream with the ten programs 1750-1759. From the NVOD cycle information, the stagger period is determined, in step 2216, such that the size of the first portion 2012-1 is known. The first portion 2012-1 of any new programs 1750-1759 are recorded in step 2218. New programs are those that do not currently have a first portion 2012-1 stored that is equal to or greater in length than the stagger period.

In step 2220, the user may select VOD-like control of playback. If this selection is made, the remaining portion(s) 2012-2 of the program 1750-1759 are gathered from the appropriate transponders 1704 in step 2228. The program 2016 played such that the user can control playback.

If the user does not select VOD playback in step 2220, a check is made in step 2224 for a new NVOD cycle 1712-1715. If there is no new NVOD cycle 1712-1715 processing doubles-back to step 2220. Alternatively, processing proceeds from step 2224 to step 2208 if a new NVOD cycle 1712-1715 is about to begin. It is noted, that looping back to step 2208 occurs after the stagger period expires.

In light of the above description, a number of advantages of the present invention are readily apparent. The first portion of a number of programs may be recorded in parallel to quickly be ready to play a number of NVOD programs with VOD-like control over playback. This VOD-like capability is possible without the storage requirements necessary for conventional VOD.

A number of variations and modifications of the invention can also be used. In different embodiments, the programs sent to the users could be video or audio programs. The various embodiments described above use satellite and cable links to receive programs, however packet switched networks such as the Internet could also be used. Additionally, the control data channel could also use the Internet to communicate between the set top box and subscriber management system.

Some of the above embodiments discuss the present invention in terms of additional or premium content providers. In other embodiments the present invention could be applied to true video-on-demand services, near video on demand services, pay-per-view services, home shopping channels, commercial supported channels, or other television programming options. The user could simply pause, rewind or fast-forward any program on television to switch to a prerecorded version which the user could control playback. Alternatively, the user could go to a menu and get access to prerecorded programs for any channel.

The above embodiments store content either remotely or locally. Local storage is provided within a set top box. However, other embodiments could store locally in a number of ways. The storage device could be a video cassette recorder, a digital tape recorder, a hard drive, solid state storage, an optical drive, or other known storage mechanisms. The storage media could be removable or non-removable. The storage device could be external to the set top box and coupled thereto with a dedicated cable, wireless transceiver, and/or packet switched network.

Some of the above embodiments are discussed in the context of cable television systems, but other content providing techniques could be used. As discussed above, digital satellite broadcast could be used. Additionally, wireless, telephone or power line content distribution using digital or analog signals could also be used in addition to other broadband distribution techniques.

Although some of the embodiments discuss a set top box separate from a television display, it is to be understood other embodiments could include the set top box functionality as part of another component. For example, the set top box could be integrated into the television set.

Also, although some of the embodiments discuss the use of a remote control for activating certain functions, it is to be understood that other embodiments may include alternative methods for activating those functions. For example, voice activation, among other alternatives, may be used for such activation.

In one embodiment of the invention, access to club programs by club members is unlimited, in the specific sense that access to club programs may be acquired at any time by any club member. In other embodiments, access to club programs, even to club members, may be restricted. For example, within a certain period of time (such as a month), a numerical limit may be imposed on the number of times that a particular club program is accessed or viewed by a club member. As used herein, a distinction is made between accessing a club program and viewing a club program. Accessing a club program refers to any retrieval of the club program for any period of time, no matter how brief. Viewing a club program instead refers to retrieval of the club program for at least a specific length of time and within a certain timeframe. For example, a "view" may be defined as retrieval of a club program for longer than five minutes within a 24-hour period. Thus, with such a definition, a user who retrieves a particular club program at, say, seven distinct times on a given day for only four minutes at a time has accessed that club program seven times but not viewed it at all. Similarly, a user who retrieves and watches that club program in its entirety seven times on a given day has accessed that club program seven times but viewed it only once.

More complex club arrangements may have different limitations for different club programs: on a completely individual basis, according to some grouping of the club programs, or as a hybrid between individual and grouped assignments. The inclusion of such limits may allow the club programs to be provided in accordance with contractual arrangements with their copyright holders when such contractual arrangements restrict the number of times that a given program may be accessed or viewed. The effect of such limits is incorporated within the process for accessing club programs as described above, for example in the context of FIGS. 7-8B. Among other steps, an attempt to access a club program by a user initiates a determination of which program may currently be showing to the user as part of a linear programming schedule, whether that program is available as a club program, and whether the user is authorized to view that club program.

Thus, in one embodiment, each of the club programs is assigned a fixed access or view limit, which is stored by the subscriber management system 124 and/or the program request database 136. Certain embodiments include the assignment of a very large limit so that the club member is effectively given unlimited access to those particular club programs with that large limit. In other embodiments, the limit is set equal to the number of times the particular club programs appear in the regular fixed schedule. The subscriber management system additionally records the number of times that the club program has been accessed from a particular set-top box 120. When a club member attempts to access a club program, a comparison is made by the subscriber management system 124 between the number of accesses or viewings that have been recorded against the authorized number. If the prescribed limit has been reached, access is denied; conversely, if the prescribed limit has not been reached, access is granted.

In another embodiment, the access or view limit is assigned within the subscriber management system 124 according to grouping categorizations. Such categorizations may be based, for example, on subject genre, content rating, or quality rating, among other criteria. Thus, for example, in one embodiment, all club programs that are directed specifically at children may be given the very large limit value so that access to such children's programming is unlimited for club members. In hybrid embodiments, the access or view limit is assigned according to grouping categorizations for some of the club programs and assigned on an individual basis for other club programs. In still a further embodiment, the access or view limit is applied globally to all of the club programs, thereby acting so that the number of accesses or views of club programs is absolutely limited.

Various of these embodiments may be combined as different levels of service within the club, having different costs to the club members. In this way, the fee that a club member pays to access the club programs may be graduated according to the level of access that is provided. The information relating to the particular access each club member is afforded is recorded within the subscriber management system 124 for use as described above when a user attempts to access one of the club programs. This information may additionally be used to augment the service on a VOD-type basis in those cases where the user wishes to access a specific club program exceeding the scope of his service. In such instances, the additional access requested by the user may be provided while including a surcharge.

For example, if the user has an arrangement that provides access to 10 views of club programs within a given month, but wishes to view an eleventh club program in that month, he may provided the additional access by agreeing pay the surcharge. Such additional access is provided after the subscriber management system 124 verifies that the user has reached the limit of his arrangement and presents the user with information describing the additional cost imposed for the supplementary access.

Limits may also be used in other embodiments in order to implement promotional features. For example, where a user has met certain predetermined criteria, such as maintaining a club-access arrangement for a certain period of time, the limits may be adjusted by the subscriber management system 124 to provide additional access to certain club programs as a bonus. Thus, if a user has met predetermined criteria to quality for, say, a bonus of unlimited access to music videos, the subscriber management system 124 increases the limit for music videos for that user to a very large value for a period of time called the bonus period. During the bonus period, the user may then access or view all club programs categorized as music videos whenever and as frequently as he wishes.

There are different ways in which the limits may be implemented in different embodiments. In one embodiment, the subscriber management system 124 associates one or more set-top boxes 120 with a club-access arrangement. This may be appropriate, for example, where a single household or business has multiple set-top boxes 120 for multiple televisions. The subscriber management system 124 associates each of those set-top boxes 120 with a particular limit scheme, whether that limit scheme be based on individual limit assignments, group categorizations, hybrid arrangements, or otherwise. An access or view is recorded whenever a club program is accessed or viewed from any of the multiple set-top boxes 120 associated with that arrangement. In this way, for example, access to club programs may be provided to households having multiple set-top boxes 120 on the same basis as provided to households having only a single set-top box 120.

In still other embodiments, the user may be given an option to purchase a copy of a club program permanently. When such a purchase arrangement is permitted by the copyright holder, upon agreement to pay a purchase fee, the subscriber management system 124 authorizes the user to retain a permanent copy and disables the copy protection. Accordingly, the user may copy a club version of the club program onto another device, such as a PVR, VCR, or removable media, or may copy it by transmitting electronically such as by email, or otherwise. Alternatively, in embodiments where the club program is already stored at the user's set-top box 120, the subscriber management system 124 may direct the user's set-top box 120 to retain the copy of the purchased club program permanently.

In some of the above embodiments, the content provider selects the programs that are stored at the user location as part of the club. This process could be refined in other embodiments such that only some of the club programs are stored based upon the user's preferences. For example, the user could specify interesting categories or genres and only those club programs would be recorded. Without specifying preferences by the user, the viewing habits could be monitored in another embodiment. A profile of the user would be used to determine what club programs should be recorded. The user could be actively queried to create this profile or could be passively monitored to create this profile. The profiling could take into account that multiple viewers may be associated with a user location and programs should be recorded according to a composite profile for the multiple viewers.

While the principles of the invention have been described above in connection with specific apparatuses and methods, it is to be clearly understood that this description is made only by way of example and not as limitation on the scope of the invention.

What is claimed is:

1. A method for receiving a program by a user location that is sent from a content provider, the method comprising steps of:
   receiving, at the user location, signals from a plurality of transponders, wherein:
      each signal is associated with a transponder, and
      each signal comprises a plurality of programs having a start time associated therewith, the start time of each signal being staggered such that no two start times occur simultaneously;
   each time a start time occurs, recording at the user location a first segment of all of the plurality of programs associated with that start time before any user request for the program;
   detecting the user request for a selected program of the plurality of programs after recording the first segment of all of the plurality of programs; and
   recording at the user location a second segment of the selected program.

2. The method for receiving the program by the user location that is sent from the content provider as recited in claim 1, wherein the detecting step comprises a step of detecting the user request for the program during the step of recording the first segment.

3. The method for receiving the program by the user location that is sent from the content provider as recited in claim 1, wherein the recording steps comprise a step of recording on a rotating disk at the user location.

4. The method of claim 1, wherein the first segment of each of the plurality of programs are sent from the content provider on the same channel.

5. The method of claim 4, wherein the second segment of the selected program is sent from the content provider more than once and on more than one channel.

6. The method of claim 5, wherein the second digital channel does not send the first segment.

7. The method of claim 6, wherein the first digital channel does not send the second segment.

8. The method of claim 1, wherein the user location comprises a residence of the user.

9. The method of claim 1, wherein the user location comprises a Set Top Box (STB).

10. A method for receiving a program by a user location that is sent from a remote provider, the method comprising steps of:
   receiving, at the user location, a plurality of signals from a plurality of transponders, wherein:
      each signal of the plurality of signals is associated with a transponder, and
      each signal comprises a plurality of programs having a start time associated therewith, the start time of each signal being staggered such that no two start times occur simultaneously;
   each time the start time for one of the signals occurs, determining if any of a first segment of each of the plurality of programs of the one of the signals are not already stored at the user location;
   recording, at the user location, any first segment of each of the plurality of programs that are not already stored at the user location, wherein determining if any first segment of the plurality of programs are not already stored at the user location and recording any first segment that is not already stored at the user location are performed before any user request for any of the plurality of programs;

detecting the user request for one of the plurality of programs after storing the first segment of each of plurality of programs at the user location; and recording, at the user location, a second segment of the one of the plurality of programs at the user location in response to the detecting step.

11. The method for receiving the program by the user location that is sent from the remote provider as recited in claim 10, further comprising a step of recording any remaining segments of the one of the plurality of programs.

12. The method for receiving the program by the user location that is sent from the remote provider as recited in claim 10, wherein the first segment is sent on a first digital channel and the second segment is sent on a second digital channel.

13. The method for receiving the program by the user location that is sent from the remote provider as recited in claim 10, wherein the first segment and the second segment are on different transponders.

14. The method for receiving the program by the user location that is sent from the remote provider as recited in claim 10, further comprising a step of playing the one of the plurality of programs.

15. The method for receiving the program by the user location that is sent from the remote provider as recited in claim 10, wherein the detecting step comprises steps of:

receiving a wireless request from a remote control; and processing the wireless request to determine a desired program.

16. The method for receiving the program by the user location that is sent from the remote provider as recited in claim 10, wherein the first listed recording step comprises a step of recording the first segment on a mass storage device associated with a set top box at the user location.

17. The method of claim 10, wherein the first segment of each of the plurality of programs are sent from the content provider on the same channel.

18. The method of claim 17, wherein the second segment of the one of the plurality of programs is sent from the content provider more than once and on more than one channel.

19. The method of claim 10, wherein the first segment is sent only once.

20. The method of claim 10, wherein the first segment is sent via a first delivery mechanism and the second segment is sent via a second delivery mechanism.

21. The method of claim 20, wherein the first delivery mechanism comprises a cable television network and the second delivery mechanism comprises a broadband network connection.

22. The method of claim 10, wherein the user location comprises a residence of the user.

23. The method of claim 22, wherein the user location further comprises a Set Top Box (STB) at the residence of the user.

* * * * *

UNITED STATES PATENT AND TRADEMARK OFFICE
CERTIFICATE OF CORRECTION

PATENT NO. : 7,809,849 B2  Page 1 of 1
APPLICATION NO. : 09/877317
DATED : October 5, 2010
INVENTOR(S) : John J. Sie et al.

It is certified that error appears in the above-identified patent and that said Letters Patent is hereby corrected as shown below:

On the title page, in item (60), under "Related U.S. Application Data," line five should read:
--cation No. 60/275,496, filed on Mar. 13, 2001.--

Signed and Sealed this

Twenty-first Day of December, 2010

David J. Kappos
*Director of the United States Patent and Trademark Office*